United States Patent
Harb

(10) Patent No.: US 10,095,876 B2
(45) Date of Patent: Oct. 9, 2018

(54) SYSTEMS AND METHODS FOR ALLOWING A USER TO ACCESS BLOCKED MEDIA

(71) Applicant: Rovi Guides, Inc., Santa Clara, CA (US)

(72) Inventor: Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 98 days.

(21) Appl. No.: 15/019,253

(22) Filed: Feb. 9, 2016

(65) Prior Publication Data

US 2017/0228550 A1   Aug. 10, 2017

(51) Int. Cl.
*G06F 21/62* (2013.01)
*G06F 21/31* (2013.01)

(52) U.S. Cl.
CPC .......... *G06F 21/6218* (2013.01); *G06F 21/31* (2013.01)

(58) Field of Classification Search
CPC .............................. G06F 21/31; G06F 21/6218
See application file for complete search history.

(56) References Cited

U.S. PATENT DOCUMENTS

| | | |
|---|---|---|
| 7,441,706 B1 | 10/2008 | Schuessler et al. |
| 2006/0190402 A1 | 8/2006 | Patron et al. |
| 2007/0180100 A1 | 8/2007 | Biggs et al. |
| 2008/0148310 A1 | 6/2008 | Strickland |
| 2011/0185400 A1 | 7/2011 | Webber et al. |
| 2012/0017250 A1 | 1/2012 | Tirasirikul et al. |
| 2012/0284761 A1 | 11/2012 | Daigle |
| 2013/0316682 A1* | 11/2013 | Vieira .................. H04W 12/08 455/414.1 |
| 2014/0015985 A1 | 1/2014 | Hong |
| 2015/0319470 A1 | 11/2015 | Tang et al. |

FOREIGN PATENT DOCUMENTS

| | | |
|---|---|---|
| WO | WO-02/01864 | 1/2002 |
| WO | WO 2010/019095 | 2/2010 |
| WO | WO 2014/143134 | 9/2014 |

OTHER PUBLICATIONS

International Search Report, Application No. PCT/US2017/016684, dated Apr. 5, 2017 (5 pages).

* cited by examiner

*Primary Examiner* — Beemnet Dada
(74) *Attorney, Agent, or Firm* — Haley Guiliano LLP

(57) ABSTRACT

Systems and methods are provided herein for enabling a user to access a blocked media asset. These systems and methods allow a user to request that a parent, or another user, who can approve access to the blocked media asset approve access to the blocked media asset for viewing. The request may be transmitted as a notification to a mobile phone or another suitable device, such that the parent the other user can approve the request, even though they may be remote from the requesting user. Both the requesting user and the user whose approval is required to unblock the media asset (i.e., the approver), are identified by the system based on an identifier associated with each user. This informs the approver which user submitted the request. Additionally, this also adds a layer of security, since the approver must enter an identifier to authenticate their identity to the system before being able to unblock the program for the requesting user.

20 Claims, 12 Drawing Sheets

SYSTEMS AND METHODS FOR ALLOWING A USER TO ACCESS BLOCKED MEDIA

BACKGROUND

Given the plethora of content available to modern television viewers, parental control systems have become near ubiquitous in electronic program guides (EPGs), which allow users to filter content for viewing. For example, parental control systems give parents the ability to decide what their children can watch when they are not around. Typically, a parental control system will have an access code that can be input to block and unblock content. A child attempting to access a blocked program and unaware of the access code will not be able to view the program. However, the rigidity of content ratings may result in blocking some programs that a parent may find acceptable for their child to watch. For example, parents might not agree with the ratings of some programs. In this instance, if the parent was not home to input the access code, the child may not be able to watch the program.

SUMMARY

Systems and methods are provided herein for enabling a user to access a blocked media asset. These systems and methods allow a user to request that a parent, or another user who can approve access to the blocked media asset, approve access to the blocked media asset for viewing. The request may be transmitted as a notification to a mobile phone or another suitable device such that the parent or the other user can approve the request, even though they may be remote from the requesting user. Both the requesting user and the user whose approval is required to unblock the media asset (i.e., the approver), may be identified by the system based on an identifier associated with each user. This informs the approver which user submitted the request. Additionally, this also adds a layer of security, since the approver must enter an identifier to authenticate their identity to the system before being able to unblock the program for the requesting user.

In some aspects, a media guidance application receives, from a first user equipment device, a first identifier associated with a first user. For example, the media guidance application receives a first user input of an identifier. In some embodiments, the identifier comprises any finite string of characters such as numbers and letters. For example, an identifier could be "1234," "Joe123," or any other suitable identifier. In some embodiments, the identifier may be biometric data, such as a retinal scan or fingerprint. In some embodiments, the media guidance application stores the first identifier in memory associated with the first user device, such that the first user device automatically determines the first user without any input from the first user.

In some embodiments, the media guidance application compares the received first identifier to a plurality of identifiers stored in an index data structure of user profiles. The media guidance application may compare the received identifier with a plurality of identifiers stored in an index data structure. The media guidance application may associate a pointer to a user profile with each identifier in the index data structure. For example, the media guidance application may compare the input identifier, "Joe123," with identifiers stored in an index data structure. Upon comparing the received first identifier to a plurality of identifiers stored in an index data structure, the media guidance application determines if the first identifier matches an identifier stored in the index data structure of user profiles. For example, if the media guidance application determines that every character in the received identifier matches every character in a stored identifier, the media guidance application may return a boolean result that the two identifiers match to "True."

The media guidance application receives a request to allow the first user to access a media asset that is blocked for the first user. For example, the media guidance application receives a request from the first user to view a media asset that fulfills a preset blocking criterion and is blocked for viewing by the first user. For example, the media guidance application receives a request from the first user to obtain permission to view the media asset. In some embodiments, the media guidance application stores an indication that programs with a rating of "TV-MA" may be blocked for the first user. The media guidance application then blocks programs with a rating of "TV-MA" or higher from being viewed by the first user. In some embodiments, the media guidance application may generate a notification containing the request automatically when the first user selects media that is blocked.

The media guidance application determines, in a first profile associated with the first user, a second user who has authority to approve access to the media asset for the first user. For example, upon receiving the first user selection of the blocked media asset, the media guidance application queries the first profile associated with the first user to determine if there are any users with the authority to approve access to blocked media for the first user. For instance, the media guidance application may determine a user account corresponding to the mother of a child is designated as an account with authority to approve blocked media for the child. If the media guidance application does not determine a second user with authority to allow access to blocked media for the first user, the media guidance application may display a notification to the first user that the request has failed and that the media asset remains blocked.

In some embodiments, the first profile associated with the first user includes a data structure storing an age of the first user. For example, the media guidance application may store that the user "John" is 14 years old. Alternatively or additionally, the first profile associated with the first user includes a data structure storing a flag indicating whether the first user has authority to approve access to the media asset. For example, the media guidance application may store a flag that the user "John" does not have authority to approve access to the media asset he is trying to access. Alternatively or additionally, the first profile associated with the first user includes a data structure storing a social media account associated with the first user. For example, the media guidance application may store that the user "John" has a social media account with handle "JohnC13579." Alternatively or additionally, the first profile associated with the first user includes a data structure storing a phone number associated with the first user. For example, the media guidance application may store that the user "John" has a mobile telephone with the phone number, "123-456-1000." Alternatively or additionally, the first profile associated with the first user includes a data structure storing an email address associated with the first user. For example, the media guidance application may store that the user "John" has an email account "JohnC@mail.usa." Alternatively or additionally, the first profile associated with the first user includes a data structure storing a list of viewing preferences of the first user. For example, the media guidance application may store that the user "John" enjoys watching movies of the "horror" genre. Alternatively or additionally, the first profile associated with the first user includes a data structure storing a list of user profiles that have approver rights for said first user profile. For example, the media guidance application may store that users "Mom" and "Dad," which may be identified by identifiers of their profiles, have the authority to approve access to blocked media assets for user "John."

In some embodiments, the media guidance application determines, from a second profile associated with the second user, whether a second user equipment device is associated with the second user. Upon determining there is a second user with the authority to approve access, the media guidance application accesses the second profile associated with the second user. The media guidance application then queries the second profile for user equipment devices associated with the second user where the second user may receive the notification containing the request from the first user. For example, the media guidance application may determine that the user "Mom" has authority to approve access to the media asset for the first user. The media guidance application may then access a profile associated with "Mom" and query a data structure stored in the profile for user equipment associated with "Mom," such as a mobile telephone.

In some embodiments, if the media guidance application determines there is no user equipment device associated with the second user where the second user can receive the notification, the media guidance application may query the first profile associated with the first user for a third user with authority to approve access to the blocked media for the first user. For example, after the media guidance application queries a data structure in a profile associated with "Mom" for user equipment, if no user equipment is found, the media guidance application may attempt to determine if there are any other users that can approve access to the media asset for the first user, using the same or similar process as described above.

Alternatively or additionally, if the media guidance application determines that the second user has not responded for a threshold amount of time, the media guidance application may query the first profile associated with the first user for a third user with authority to approve access to the blocked media for the first user. For example, if the media guidance application transmits a notification to a user device stored in a profile corresponding to "Mom," but does not receive a response for a certain period of time (e.g. five minutes), the media guidance application may determine another user, as described above, that can allow access to the media asset and transmit the notification to a user equipment device stored in their profile (e.g. a user equipment device stored as a variable in the profile "Dad123").

The media guidance application transmits a notification to the second user on a second user equipment device associated with the second user that the first user has requested access to the blocked media asset in response to determining a second user equipment device is associated with the second user. The media guidance application may transmit a notification containing an option for the second user to unblock the media asset to the second user equipment. For example, the media guidance application may transmit the notification to the mother's mobile phone.

In some embodiments, the media guidance application generates content that helps to inform the second user's decision to unlock the media asset or deny the request from the first user. For example, the media guidance application presents as a portion of the notification a genre of the media asset that was blocked, such as "drama." Alternatively or additionally, the media guidance application presents as a portion of the notification a rating of the media asset, such as "TV-MA." Alternatively or additionally, the media guidance application presents as a portion of the notification a link to a webpage associated with the media asset, such as the homepage of a movie. Alternatively or additionally, the media guidance application presents as a portion of the notification a preview associated with the media.

Alternatively or additionally, the media guidance application presents as a portion of the notification a personalized communication from the first user, such as any combination of text, images, videos, and audio, from the first user attempting to convince the second user to unblock the media. Alternatively or additionally, the media guidance application presents as a portion of the notification an indication why the media was blocked, such as the rating exceeds the current blocking criterion. For instance, the media guidance application may determine that the first user cannot watch "TV-MA" programs and has blocked the media asset because it is rated "TV-MA" and include this information in the notification to the second user.

The media guidance application receives, from one of the second user equipment device or another user equipment device associated with the second user, a second identifier associated with the second user. For example, the media guidance application receives a second user input of a second identifier. The second identifier may comprise any finite string of characters such as numbers and letters. For example, a second identifier could be "1234" or "Mom123." In some embodiments, the media guidance application may store the identifier in memory associated with the second user device, such that the second user device automatically determines the second user without any input from the second user.

The media guidance application determines the second identifier matches an identifier associated with the second profile. The media guidance application compares the identifier received with identifiers stored in memory and associated with a plurality of profiles. Upon determining a match between the second identifier and an identifier associated with the second profile, the media guidance application may apply settings, permissions, and other data stored in the second profile to the second user equipment. For example, upon matching the inputted identifier to an identifier corresponding to a profile for "Mom" in memory, the media guidance application may allow the user "Mom" to unblock the program that the first user has requested to access.

The media guidance application generates for display an option to unblock the media asset for access by the first user on the first user equipment device in response to determining the second identifier matches an identifier associated with the second profile. For example, the media guidance application presents a selectable icon or other selectable feature to the user "Mom" indicating that they can unblock the media asset that the first user desires to access in response to determining the second identifier (e.g., "Mom123") matches an identifier associated with the second profile.

In some embodiments, the media guidance application generates for display with the option to unblock the media asset an option to communicate with the first user. For example, the media guidance application may allow the second user to transmit a message asking the first user if they have taken out the trash. The media guidance application may allow two-way communication. For example, the first user may respond that they have taken out the trash and to please unblock the media asset.

Alternatively or additionally, the media guidance application generates for display with the option to unblock the media asset an option to approve the media asset for access during a predetermined period of time. For example, the media guidance application generates for display an option to unblock the media asset over a period of time specified by the second user (e.g., 5 pm-8 pm). Upon selection by the second user, the media guidance application will unblock the program only during the period of time specified by the second user. Alternatively or additionally, the media guidance application generates for display with the option to unblock the media asset an option to unblock a different version of the media. For example, the media guidance application generates for display a list of alternative versions of the media asset that may be more appropriate for the first user (e.g., "without obscenity" or a "director's cut"). Upon selection by the second user of an alternative version, the media guidance application will unblock that version of the media asset for access by the first user.

The media guidance application unblocks the blocked media asset for access by the first user on the first user equipment device upon receiving a selection of the option to unblock the media asset. For example, after the second user has approved access by the first user of the media asset, the media guidance application unblocks the media asset and allows the first user to access the media asset. Additionally, as described in some embodiments, if the second user has stipulated any conditions attached to accessing the media asset, the media guidance application may implement those as well. For example, if the media guidance application received an indication from the second user that the first user should not view a television program after 8 pm, the media guidance application will unblock the program only until 8 pm.

In some embodiments, the media guidance application receives a conditional allowance from the second user for the first user to access a media asset if an allowance criterion is met by the first user. For example, before the first user attempts to access the media asset, the media guidance application receives input from the second user that the media asset can be unblocked if the first user has fulfilled the allowance criterion. The media guidance application stores the allowance criterion in memory in the first profile associated with the first user. Upon selection of the blocked media asset by the first user, the media guidance application determines the allowance criterion must be met before unblocking the media asset. The media guidance application then generates for display a notification to the first user with the allowance criterion, which may require user input in order to be fulfilled. The allowance criterion may be a message displayed by the media guidance application to the first user asking him or her to confirm that he or she has done a specific task by pressing the "OK" button. As another example, the allowance criterion may require the first user to transmit a photograph or video to the second user confirming they have completed a specific task. Upon successfully meeting the allowance criterion, the media guidance application unblocks the media asset for access by the first user.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for enabling a user to access a blocked media asset. These systems and methods allow a user to request that a parent, or another user, who can approve access to the blocked media asset approve access to the blocked media asset for viewing. The request may be transmitted as a notification to a mobile phone or another suitable device, such that the parent the other user can approve the request, even though they may be remote from the requesting user. Both the requesting user and the user whose approval is required to unblock the media asset (i.e., the approver), are identified by the system based on an identifier associated with each user. This informs the approver which user submitted the request. Additionally, this also adds a layer of security, since the approver must enter an identifier to authenticate their identity to the system before being able to unblock the program for the requesting user.

As referred to herein, a "media guidance application." or an "interactive media guidance application" or, sometimes, a "media guidance application" or a "guidance application" is an application that allows a user to consume, and/or navigate to, media assets. In some embodiments, the media guidance application may be provided as an online application (i.e., provided on a website), or as a stand-alone application on a server, user device, etc. In some embodiments, control circuitry installed on various devices and platforms may execute the media guidance application, as described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Figure 1:
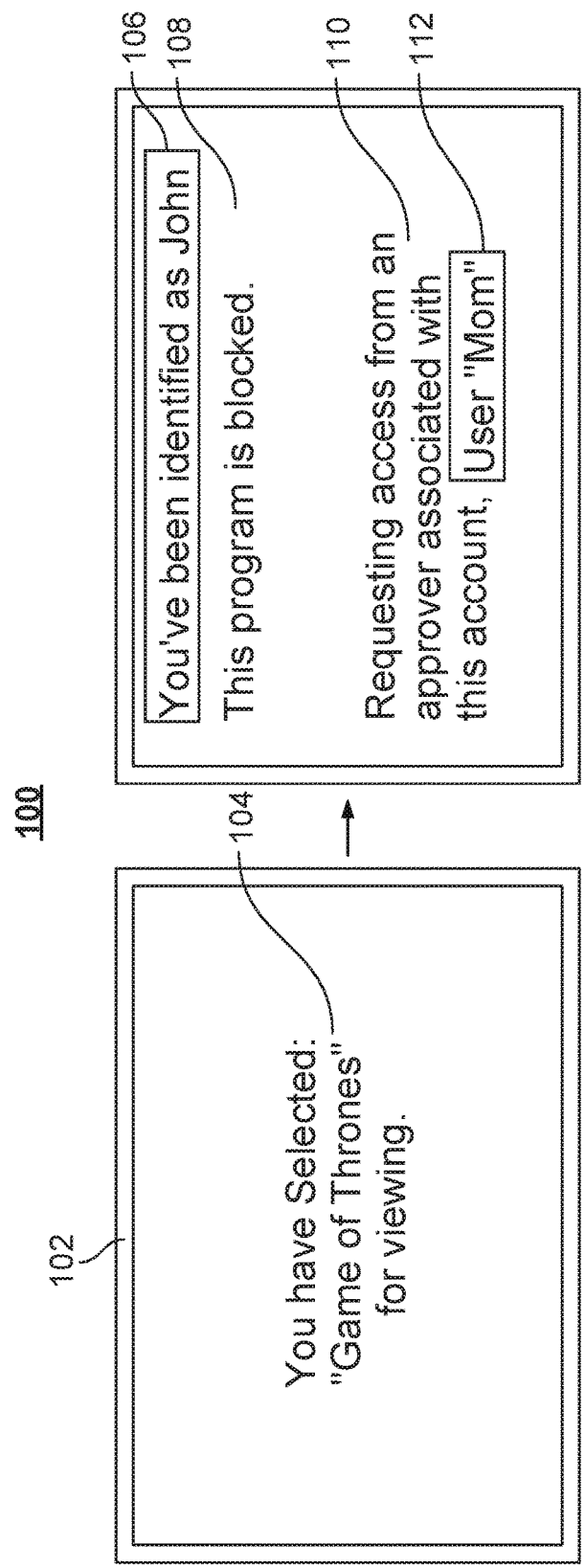
FIG. 1 shows an illustrative display of a parental control module of a media guidance application in accordance with some embodiments of the disclosure.

FIG. 1 shows an illustrative display of a parental control module of a media guidance application in accordance with some embodiments of the disclosure. For example, display 100 may represent an interface with parental control module 102 of a media guidance application used by a user to transmit a message to another user that they wish to access a media asset that is currently blocked. Display 100 may appear on one or more user devices (e.g. any of the devices listed in FIGS. 9-10 below). Moreover, the media guidance application may use one or more of the processes described in FIGS. 11-14 below to generate display 100 or any of the features described therein.

FIG. 1 includes display 100. Display 100 may appear on a display device (e.g., user equipment devices 1002, 1004, and/or 1006 (FIG. 10) below). Furthermore, control circuitry 904, as described below in relation to FIG. 9, may be used to generate a display 100. Display 100 includes parental control module 102 of the media guidance application indicating that a user has selected media asset 104, "Game of Thrones," for viewing. For example, the media guidance application receives a request by the first user to view media asset 104. The media guidance application determines the first user by storing a first identifier corresponding to the first user in memory (e.g., storage as described in FIG. 9 below) associated with the first user device, such that the first user device automatically determines the first user without any input from the first user. For example, the media guidance application may store that the device, "John's television," should always be associated with a user account for user John, which may be identified by an identifier corresponding to a profile name, "John123."

The media guidance application may determine that media asset 104 fulfills a blocking criterion for the first user. Continuing from the previous example, the media guidance application may store an indication that media assets with a rating of "TV-MA" and higher are blocked for "John123." The media guidance application may store the indication that categories of media assets are blocked for John in a data structure stored in memory, which may be local or remote on another device or server, as described further by FIGS. 9-10 below. For example, the data structure may be structured as an object of a class, as is typical of object-oriented programming languages such as C++. In this case, the class may be a "user profile" class, which creates a general template of variables and constants that are stored in memory. The variables and constants may additionally include:
  an age of the user;
  a flag indicating whether the user has authority to approve access to the media asset;
  a social media account associated with the user;
  a phone number associated with the user;
  an email address associated with the user;
  a list of viewing preferences of the user; and/or
  a list of user profiles that have approver rights for the current user profile.

Each individual profile, such as the profile for "John123," is an object of the user profile class and the variables and constants described are initialized with values corresponding to the specific user. For example, a Boolean for whether the user can access media assets with a rating of "TV-MA" may be set to "False" for user profile "John123." The media guidance application then blocks media assets with a rating of "TV-MA," such as media asset 104, from being viewed by John, based on the stored information in the user profile corresponding to John.

Upon determining the first user and whether the selected media asset should be blocked, display 100 includes message 106 informing the user which identifier, corresponding to a profile, was automatically received by the media guidance application. For example, the media guidance application may generate message 106 that the user currently identified based on the received identifier is John. In alternate embodiments, message 106 may be selectable and upon selection allow a user to manually input, using a user input interface as described in FIG. 9, a different identifier, similar to that described in FIGS. 3-4. For example, John's mother may be using his device and want to access a media asset that is blocked for John. The media guidance application may receive an alternate identifier from John's mother which corresponds to a different stored profile where access is allowed for a particular media asset that was not allowed for John.

Display 100 additionally includes an indication 108 that the media asset was blocked. Continuing with the previous example, the media guidance application blocks media assets with a rating of "TV-MA," such as media asset 104, from being viewed by John, based on the stored information in the user profile corresponding to John. The media guidance application then generates for display on display 100 indication 108.

Display 100 additionally includes a notification 110 that the media guidance application is transmitting a request to allow access to media asset 104 to a user with authority to approve access, user 112. For example, the media guidance application may generate for display on display 100 that the request has been sent to user 112, "Mom." The media guidance application may determine a user that has authority to approve access to media assets for the first user based on information stored in the profile for the first user. For example, in the profile for "John123," the media guidance application may store identifiers associated with profiles which have authority to approve access to media assets for "John123," such as the identifier of the profile for user Mom, which could be, "Mom1980."

In some embodiments, the media guidance application determines, from a second profile associated with the second user, whether a second user equipment device is associated with the second user. For example, the media guidance application may query the data structure stored in memory corresponding to the user profile for Mom for a user device where Mom can receive the request. As described above, the user equipment device may be stored in a variable that is located in the object corresponding to the profile for "Mom1980." The media guidance application may retrieve the data stored in this variable, which contains information allowing the media guidance application to contact the user equipment device. For example, if the device is a mobile phone, the media guidance application may retrieve the phone number and transmit the request via a text message. If the media guidance application determines there is not a user equipment device associated with the second user where the second user can receive the request, the media guidance application may query the data structure associated with the first profile again for another user with authority to approve access to the blocked media for the first user. For example, if no user equipment device information was stored in profile "Mom1980." the media guidance application may determine from querying the data structure storing user profiles with authority to approve access associated with the profile for user "John123" that "Dad1979" has authority to approve access as well.

In some aspects of the disclosure, the media guidance application transmits a notification to the second user on a second user equipment device associated with the second user that the first user has requested access to the media asset that is blocked in response to determining a second user equipment device is associated with the second user. For example, upon determining a second user equipment device is associated with the second user, the media guidance application may transmit a notification that the first user has requested access to the media asset containing an option for the second user to unblock the media asset to the second user equipment. For instance, the media guidance application may determine that the user Mom has a mobile phone as a result of the querying and may transmit the request to the mobile phone.

Alternatively or additionally, if the media guidance application determines that the second user has not responded for a threshold amount of time, the media guidance application may query the data structure stored in memory containing the first profile associated with the first user for a third user with authority to approve access to the blocked media for the first user. For example, if the media guidance application transmits a notification to a user device stored in a profile corresponding to Mom, but does not receive a response for a threshold period of time (e.g., five minutes), the media guidance application may determine another user that can allow access to the media asset and transmit the request to a user equipment device stored in their profile (e.g., a user equipment device stored as a variable in the profile "Dad1979," as described above).

Figure 2:
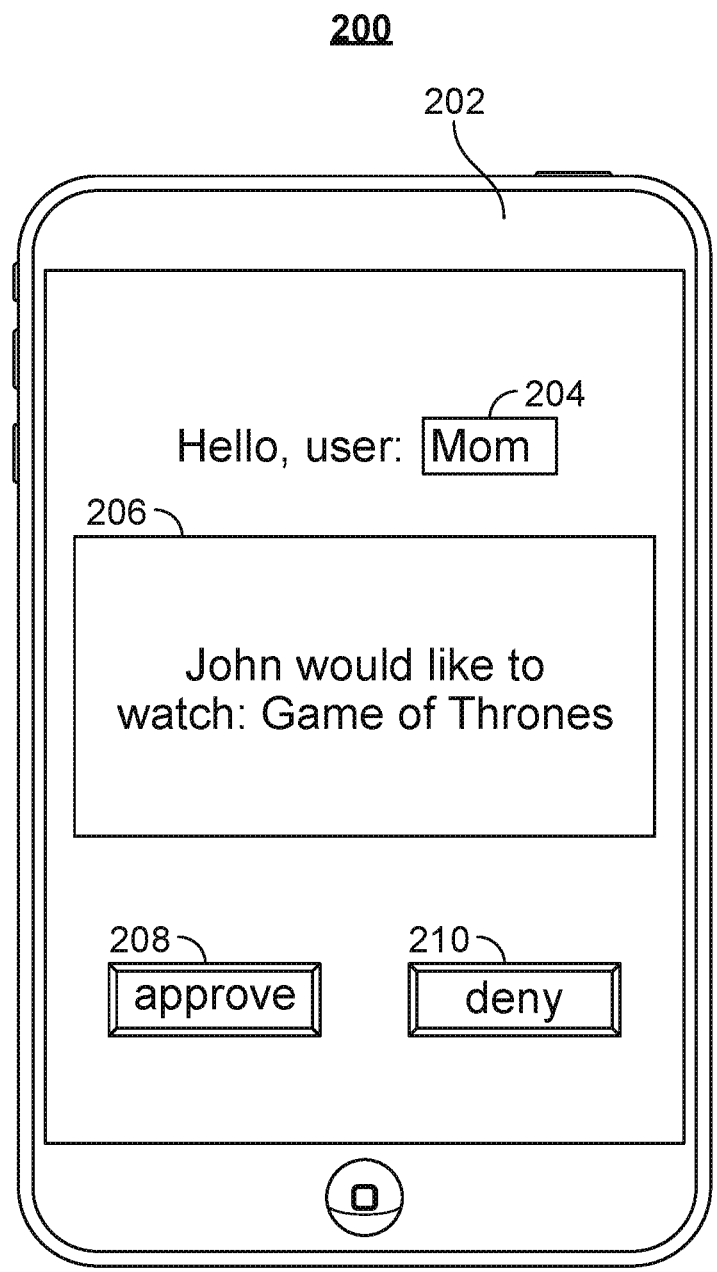
FIG. 2 shows another illustrative display of a parental control module of a media guidance application in accordance with some embodiments of the disclosure.

FIG. 2 shows another illustrative display of a parental control module of a media guidance application in accordance with some embodiments of the disclosure. For example, display 200 may represent an interface with parental control module 202 of a media guidance application used by a user to approve access to the blocked media asset. Display 200 may appear on one or more user devices (e.g., any of the devices listed in FIGS. 9-10 below). Moreover, the media guidance application may use one or more of the processes described in FIGS. 11-14 below to generate display 200 or any of the features described therein.

FIG. 2 includes display 200. Display 200 may appear on a display device (e.g., user equipment devices 1002, 1004, and/or 1006 (FIG. 10) below). Furthermore, control circuitry 904, as described below in relation to FIG. 9, may be used to generate a display 200. Display 200 includes parental control module 202 of the media guidance application indicating that a user is requesting media asset 206, be unblocked. For example, the media guidance application may present the request from the first user, John, to access media asset 206, "Game of Thrones."

In some aspects, the media guidance application determines the second user by storing a second identifier corresponding to the second user in memory associated with the second user device, such that the second user device automatically determines the second user without any input from the first user. For example, the media guidance application may store that the device, "Mom's phone," should always be associated with a user account for user Mom, which may be identified by an identifier corresponding to a profile name, "Mom1980." Display 200 includes message 204 informing the user which identifier, corresponding to a profile, was automatically received by the media guidance application. For example, the media guidance application may generate message 204 that the user currently identified based on the received identifier is Mom. In alternate embodiments, message 204 may be selectable and upon selection allow a user to manually input, using a user input interface as described in FIG. 9, a different identifier, similar to that described in FIGS. 3-4. For example, user Dad may be using user Mom's device and may want to switch profiles. The media guidance application may receive an alternate identifier from Dad which corresponds to a different stored profile.

If the media guidance application determines the second identifier received does not correspond to a profile stored in an index data structure of user profiles, the media guidance application may query the first profile associated with the first user again for another user with authority to approve access to the blocked media for the first user. For example, after the media guidance application determines the identifier does not correspond to a profile, the media guidance application may query the data structure containing users with authority to approve access associated with the first profile. The media guidance application may attempt to determine if there are any other users that can approve access to the media asset for the first user, using the same process as described above in FIG. 1.

The media guidance application may generate for display an option to unblock the media asset for access by the first user on the first user equipment device in response to determining the second identifier matches an identifier associated with the second profile. For example, upon determining that the user of the device is Mom, based on the identifier "Mom1980" pointing to the profile associated with Mom, the media guidance application generates for display on display 200 a selectable icon 208 or other selectable feature to the second user indicating that they can unblock the media asset 206 that the first user wishes to access. The media guidance application may additionally generate for display on display 200) an option to deny the request 210. In some embodiments, the option to deny the request 210 may be an option to close the notification, where closing the notification acts as an implicit denial of the request.

The media guidance application may unblock the blocked media asset for access by the first user on the first user equipment upon receiving a selection of the option to unblock 208 the media asset 206. For example, after user Mom has approved access by user John of the media asset, the media guidance application may unblock the media asset and allow John to access the media asset. Conversely, upon selection of option to deny 210 by user Mom, media asset 206 will remain blocked and inaccessible to user John.

Figure 3:
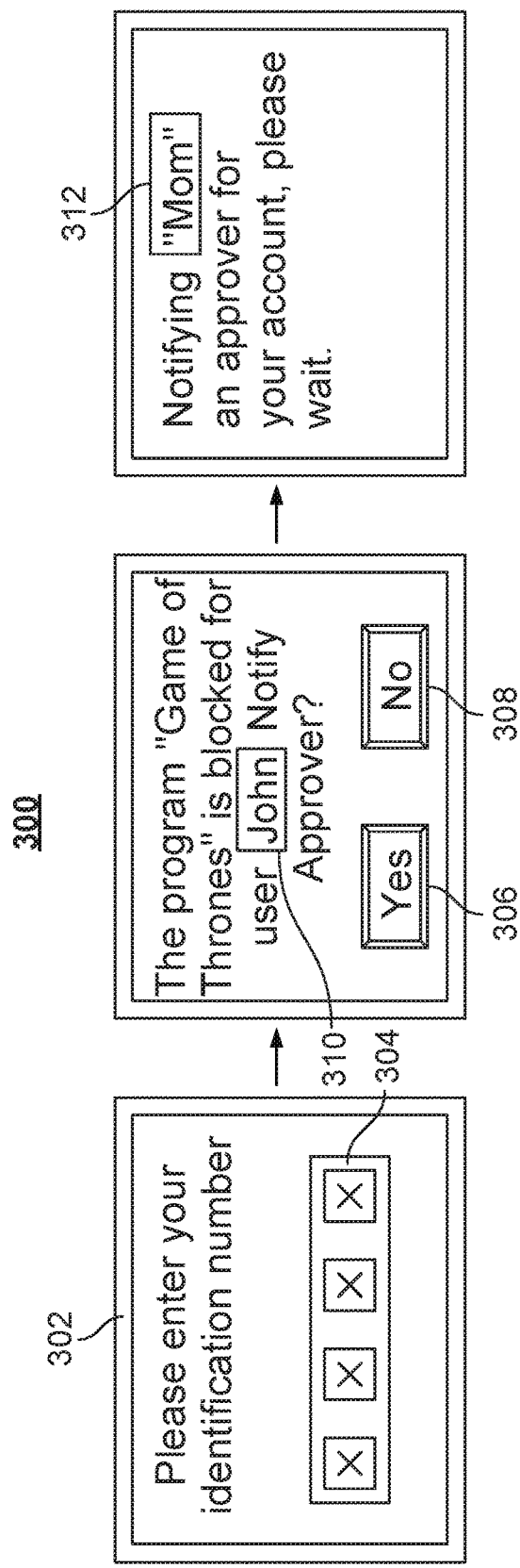
FIG. 3 shows yet another illustrative display of a parental control module of a media guidance application in accordance with some embodiments of the disclosure.

FIG. 3 shows yet another illustrative display of a parental control module of a media guidance application in accordance with some embodiments of the disclosure. For example, display 300 may represent an interface with parental control module 302 of a media guidance application used by a user to approve access to the blocked media asset. Display 300 may appear on one or more user devices (e.g., any of the devices listed in FIGS. 9-10 below). Moreover, the media guidance application may use one or more of the processes described in FIGS. 11-14 below to generate display 300 or any of the features described therein.

FIG. 3 includes display 300. Display 300 may appear on a display device (e.g., user equipment devices 1002, 1004, and/or 1006 (FIG. 10) below). Furthermore, control circuitry 904, as described below in relation to FIG. 9, may be used to generate a display 300. Display 300 includes parental control module 302 of the media guidance application prompting the user to input an identifier 304. The media guidance application may receive the user input of the identifier using a user input interface as described in FIG. 9. The identifier may comprise any finite string of characters such as numbers and letters. For example, an identifier could be, "1234" or "Joe123." In some embodiments, the identifier may be biometric data, such as a retinal scan or fingerprint.

The media guidance application matches the identifier input by the user to a profile stored in memory, as described in detail in FIG. 1. For example, upon receiving the user input "John123," the media guidance application may determine that the identifier "John123" matches an identifier of a profile stored in memory corresponding to user John. Display 300 includes message 310 informing the user which identifier, corresponding to a profile, was received by the media guidance application. For example, the media guidance application may generate message 310 that the user currently identified, based on the received identifier, is John.

The media guidance application generates for display on display 300 a selectable option to notify the approver 306. For example, upon selection by the user of selectable option 306, the media guidance application determines a second user to transmit the request to, as described above in FIG. 1. The media guidance application may generate for display selectable option 308 to not notify the approver. Upon selection by the user using a user input interface, as described in FIG. 9, of selectable option 308, the media asset will remain blocked and no request will be transmitted to the user.

In some embodiments, the selectable option to request approval 306 may further comprise an option to choose a specific user with authority to approve access to the media asset to transmit the request to from a plurality of users with authority to approve access to the media asset. For example, John may know that his mother is unavailable and may want the media guidance application to instead transmit the request to his father who is also listed as a user with authority to approve access to the media asset for John in John's profile stored in memory. In some embodiments, the media guidance application may choose the user with authority to approve access to the media asset to transmit the request to based on a flag indicating a specific user is a default user in the profile associated with the first user. For example, in a profile corresponding to John, John's mother may be indicated as the default user to notify, in which case the media guidance application will transmit the notification to John's mother first.

The transmission of the request to approve access by the media guidance application is performed as described above in FIG. 1. Display 300 additionally includes a notification 312 that the media guidance application is transmitting a request to allow access to the media asset to a user with authority to approve access, user 312, as described above in FIG. 1. For example, the media guidance application may generate for display on display 100 that the request has been sent to user 312, "Mom."

Figure 4:
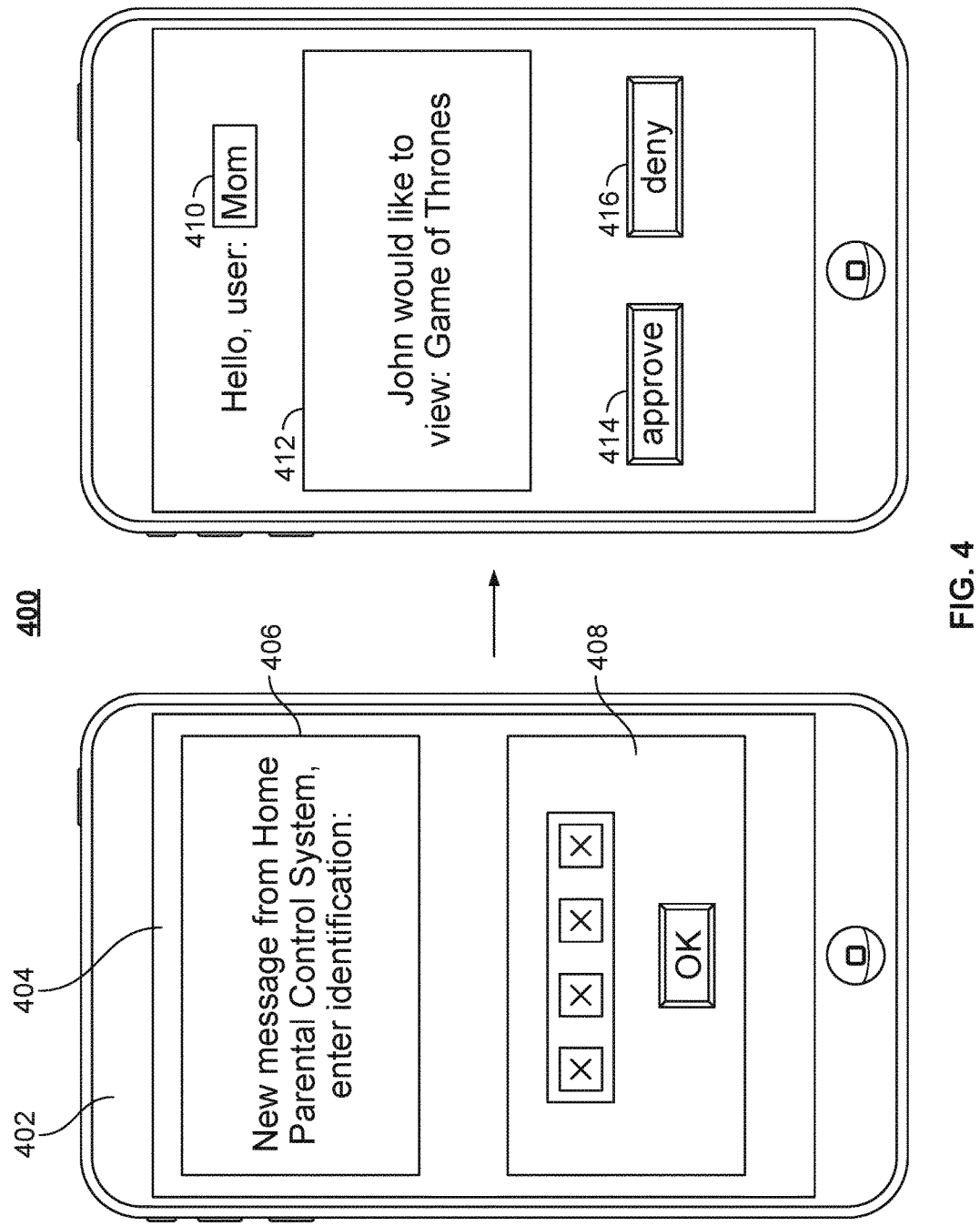
FIG. 4 shows yet another illustrative display of a parental control module of a media guidance application in accordance with some embodiments of the disclosure.

FIG. 4 shows yet another illustrative display of a parental control module of a media guidance application in accordance with some embodiments of the disclosure. For example, display 400 may represent an interface with parental control module 402 used by a user to receive a request to approve access to the blocked media asset. Display 400 may appear on one or more user devices (e.g., any of the devices listed in FIGS. 9-10 below). Moreover, the media guidance application may use one or more of the processes described in FIGS. 11-14 below to generate display 400 or any of the features described therein.

FIG. 4 includes display 400. Display 400 may appear on a display device (e.g., user equipment devices 1002, 1004, and/or 1006 (FIG. 10) below). Furthermore, control circuitry 904, as described below in relation to FIG. 9, may be used to generate a display 400. Display 400 includes parental control module 402 of the media guidance application indicating that a user has requested to access media asset 404, "Game of Thrones." For example, the media guidance application receives a notification containing a request by the first user 310 to view media asset 404 and prompts the second user for identification 408 before allowing the user to choose whether or not to approve the request, in order to ensure the user with authority to approve access to the media asset is the one using the user equipment device.

Display 400 includes parental control module 402 prompting the user to input an identifier 408. The media guidance application may receive the user input of the identifier using a user input interface as described in FIG. 9. The identifier may comprise any finite string of characters such as numbers and letters. For example, an identifier could be, "1234" or "Joe123."

The media guidance application matches the received identifier, input by the user, to a profile stored in memory, as described in detail in FIGS. 1-2. For example, upon the media guidance application receiving the user input "Mom1980," the media guidance application may determine that the identifier "Mom1980" matches an identifier of a profile stored in memory corresponding to user 410.

Display 400 includes message 410 informing the user which identifier, corresponding to a profile, was received by the media guidance application. For example, the media guidance application generates a message that user 410 currently identified, based on the received identifier is Mom. The media guidance application generates for display on display 400 the notification that the first user wishes to access blocked media asset 412. For example, the media guidance application generates for display that user John would like to access, "Game of Thrones." In some embodiments, the media guidance application may generate for display an option to unblock the media asset 414 for access by the first user on the first user equipment device and an option to deny the request 416 and leave the media asset blocked. These options operate in the same manner as options 208 and 210 described in FIG. 2.

Figure 5:
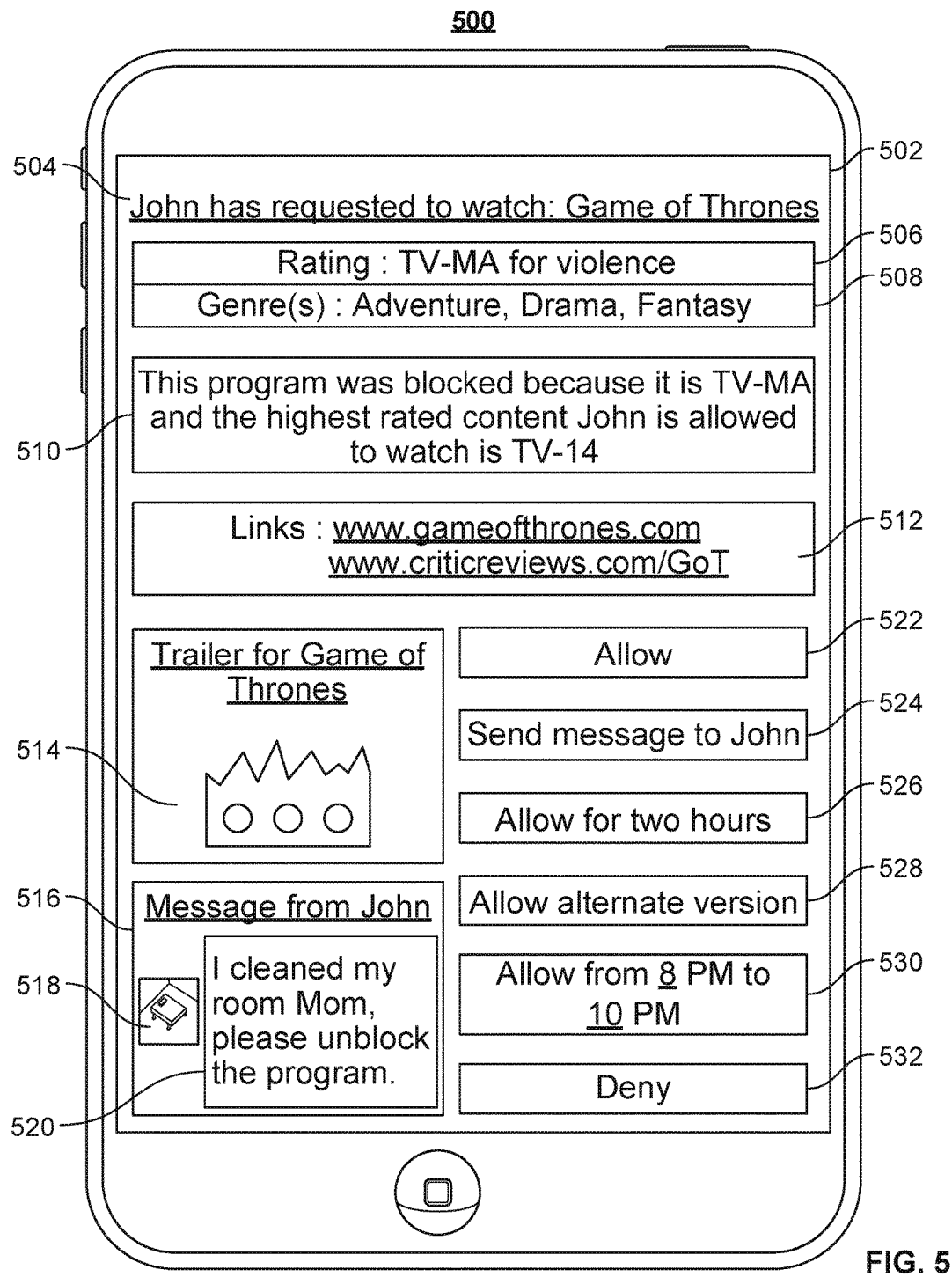
FIG. 5 shows yet another illustrative display of a parental control module of a media guidance application in accordance with some embodiments of the disclosure.

FIG. 5 shows yet another illustrative display of a parental control module of a media guidance application in accordance with some embodiments of the disclosure. For example, display 500 may represent an interface with parental control module 502 of the media guidance application used by a user to receive a request to approve access to the blocked media asset with additional information that may help the user decide whether to approve the request. Display 500 may appear on one or more user devices (e.g., any of the devices listed in FIGS. 9-10 below). Moreover, the media guidance application may use one or more of the processes described in FIGS. 11-14 below to generate display 500 or any of the features described therein.

FIG. 5 includes display 500. Display 500 may appear on a display device (e.g., user equipment devices 1002, 1004, and/or 1006 (FIG. 10) below). Furthermore, control circuitry 904, as described below in relation to FIG. 9, may be used to generate a display 500. Display 500 includes parental control module 502 of the media guidance application indicating that a user has requested to access media asset 504. For example, the media guidance application generates for display the notification 504 from user John to access the media asset, "Game of Thrones."

Figure 10:
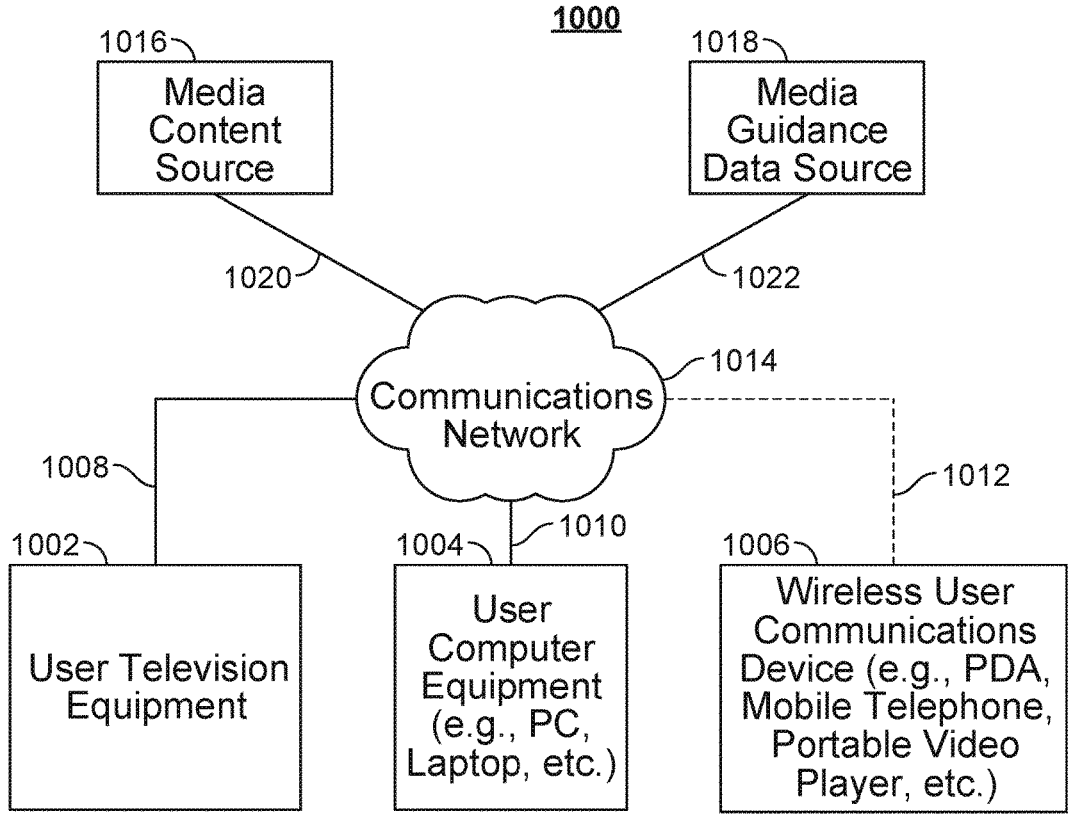
FIG. 10 is a block diagram of an illustrative media system in accordance with some embodiments of the disclosure.

The media guidance application may retrieve data associated with the blocked media asset from a data structure associated with the blocked media asset stored at a media guidance data source via a communications network as described in FIG. 10. For example, the data structure may contain: a genre of the media, a rating of the media, and/or a link to a webpage associated with the media.

The media guidance application may generate for display on display 500 as a portion of the notification a rating of the media asset 506, such as "TV-MA." Alternatively or additionally, the media guidance application may generate for display on display 500 as a portion of the notification a genre 508 of the media asset that was blocked, such as "drama." Alternatively or additionally, the media guidance application may generate for display on display 500 an indication 510 why the media asset was blocked. For example, the media guidance application may determine that the first user cannot watch "TV-MA" programs based on data stored in the first user profile and has blocked the media asset because it is rated "TV-MA" and may include this information in the notification to the second user. Alternatively or additionally, the media guidance application may generate for display on display 500 as a portion of the notification a link to a webpage 512 associated with the media asset, such as the official homepage for a movie or television show. Alternatively or additionally, the media guidance application may generate for display on display 500 as a portion of the notification a preview 514 associated with the media asset. For example, the media guidance application may retrieve the preview 514 associated with the media asset from a media content source via a communications network, as described in FIG. 10.

Alternatively or additionally, the media guidance application may generate for display on display 500 as a portion of the notification a personalized communication from the first user 516, such as text 520 and/or image 518 from the first user. For example, user John may try to convince his mother to unlock the media asset by showing her a image of his recently cleaned room and explaining that because he cleaned his room he deserves access to the media asset. Alternatively or additionally, the media guidance application may present a selectable option to transmit a message 524 to the first user. Upon selection of selectable option 524 by the second user using a user input interface as described in FIG. 9, the media guidance application receives a message from the second user, using a user input interface as described in FIG. 9, to the first user requesting access of the media asset. The media guidance application then transmits the personalized communication to the first user equipment device using a communications network, as described in FIG. 10. For example. John's mother may transmit a communication asking John if in addition to cleaning his room he also took out the trash.

The media guidance application may generate for display on display 500 as a portion of the notification a selectable option 526 to allow access to the media asset for a set amount of time. Upon selection of selectable option 526, the media guidance application may receive a user selection of a period of time to allow the requesting user access to the media. For example, the media guidance application may receive from John's mother a selection of selectable option 526 to allow access to the media asset for only two hours for John so that he goes to bed before it gets too late. Alternatively or additionally, the media guidance application may generate for display on display 500 as a portion of the notification a selectable option to allow access to the media asset during a specific range of times 530 as opposed to two hours starting from the time the second user unblocks the media asset. Upon selection of selectable option 530, the media guidance application may receive a user selection of a start and end time to allow the requesting user access to the media. For example, the media guidance application may receive a selection of selectable option 530 from John's mother to allow access to the media asset between 6 pm and 8 pm for John so that he goes to bed before it gets too late.

The media guidance application may store, in the first user profile, a data structure such as a structure in C++, that contains variables referring to the specific media asset the first user is authorized to access and any conditions attached to the first user's ability to access. The media guidance application will set variables in the data structure based on the selections of conditions required by the second user for the first user to access the media asset. For example, upon the media guidance application receiving selection of selectable option 530 and receipt of a start and end time, the media guidance application may set variables "start" and "end" to the times selected by the user with authority to approve access. The media guidance application will then check to ensure that the condition is met before unblocking the media asset for access by the first user.

Alternatively or additionally, the media guidance application may generate for display on display 500 as a portion of the notification a selectable option to allow access to an alternate version 528 of the media asset. Upon selection of selectable option 528, the media guidance application may receive a user selection of a particular version of the media asset that may be more appropriate for the requesting user to access. For example. John's mother may allow John to access a version of the media asset where obscenities and nudity are obscured, which the media guidance application may access via a communications network from a media content source as described in FIG. 10.

The media guidance application may generate for display an option to unblock the media asset 522 for access by the first user on the first user equipment device and an option to deny the notification 532 and leave the media asset blocked. These options operate in the same manner as options 208 and 210 described in FIG. 2.

Figure 6:
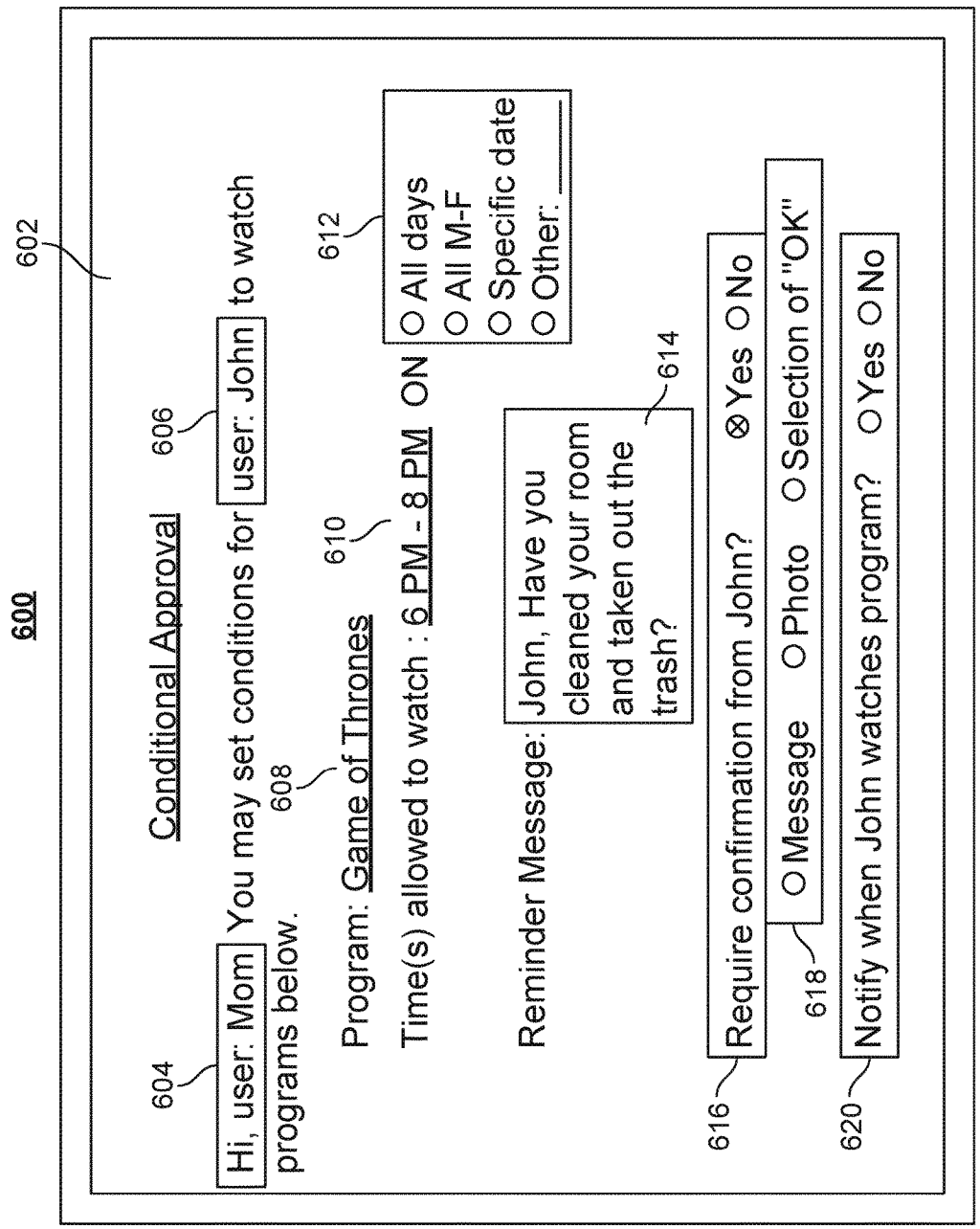
FIG. 6 shows yet another illustrative display of a parental control module of a media guidance application in accordance with some embodiments of the disclosure.

FIG. 6 shows yet another illustrative display of a parental control module of a media guidance application in accordance with some embodiments of the disclosure. For example, display 600 may represent an interface with parental control module 602 of a media guidance application used by a user with authority to control access to media assets to set conditional approval conditions for future access by another user. Display 600 may appear on one or more user devices (e.g., any of the devices listed in FIGS. 9-10 below).

Moreover, the media guidance application may use one or more of the processes described in FIGS. 11-14 below to generate display 600 or any of the features described therein.

FIG. 6 includes display 600. Display 600 may appear on a display device (e.g., user equipment devices 1002, 1004, and/or 1006 (FIG. 10) below). Furthermore, control circuitry 904, as described below in relation to FIG. 9, may be used to generate a display 600. Display 600 includes parental control module 602 of the media guidance application indicating that user 604, "Mom," has been identified based on an identifier, which could either be stored in memory, as described in FIGS. 1-2 or input by the user, as described in FIGS. 3-4.

Figure 9:
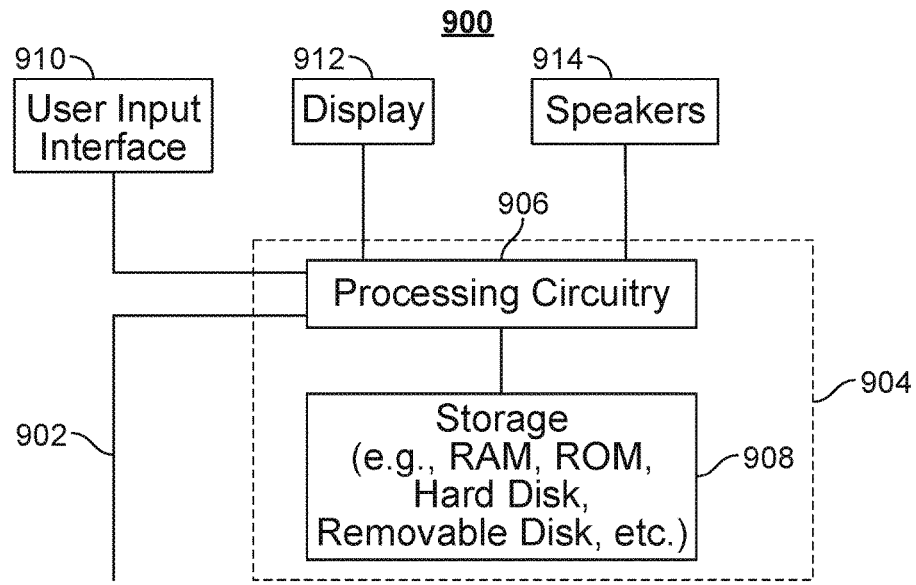
FIG. 9 is a block diagram of an illustrative user equipment device in accordance with some embodiments of the disclosure.

In some aspects of the disclosure, the media guidance application may receive a second user selection, using a user input interface as described in FIG. 9, of first user 606 for whom they have authority to approve access to media assets. For example, the media guidance application may receive a selection by John's mother (user "Mom") of John. The media guidance application receives a selection of media asset 608 from the second user, using a user input interface as described in FIG. 9. For example, the media guidance application may receive a selection from John's mother of the media asset. "Game of Thrones," to attach conditional approval conditions to.

In some embodiments, the media guidance application may receive a second user selection of a period of time 610 the first user is allowed to access the media asset. For example, the media guidance application may receive a user input from the second user of a start and end time during the day that the first user is allowed access to the media asset. For instance, the media guidance application may receive from John's mother a selection of the start time 6 pm and the end time 8 pm. In some embodiments, the media guidance application may receive a selection of specific days 612 for which the period of time 610 is applicable. The specific days could refer to, "all days," "only Monday-Friday," "a specific date," or "other." For example, the media guidance application may receive a selection by John's mother of "All M-F," meaning that John is allowed to access the media asset on Monday through Friday during the time period specific in 610.

In some embodiments, the media guidance application may receive a second user input of reminder message 614. The reminder message may comprise text, images, or other multimedia displayable to the first user. For example, the media guidance application may receive from John's mother text asking John if he has cleaned his room and taken out the trash, which may then be displayed by the media guidance application when John accesses the media asset. In some embodiments, the media guidance application may generate for display on display 600 an option to require confirmation from first user 616. For example, if the media guidance application receives a second user selection of "Yes," the media guidance application will require acknowledgement by the user that they have received and understood reminder message 614.

In some embodiments, the media guidance application may generate for display on display 600 an option to choose the form of the confirmation 618 required by the first user. For example, if the media guidance application receives a selection of "Yes" for the option to require confirmation 616, the media guidance application may receive an additional selection of option to choose the form of the confirmation 618. For example, the media guidance application may receive a second user selection requiring a "message," a "photo," or a "selection of OK." If the media guidance application receives a selection of "message," it may require the first user to input a text message, which is then transmitted to the second user, before unblocking the media asset. If the media guidance application receives a selection of "photo," it may require the first user to input a photo, which is then transmitted to the second user, before unblocking the media asset. If the media guidance application receives a selection of "selection of OK," the media guidance application may require the first user to acknowledge the reminder by selecting a selectable option labeled "OK" before unblocking the media asset.

In some embodiments, the media guidance application may generate for display on display 600 an option to notify the second user when the first user attempts to access 620 the media asset. For example, upon receiving a selection of "Yes" by the second user, the media guidance application will transmit a notification to the second user when the first user attempts to access the media asset. The media guidance application may transmit the notification that the first user is attempting to access the media asset regardless of whether the first user successfully accesses the media asset by fulfilling the approval criteria. The media guidance application may determine a user equipment device associated with the second user by querying a data structure of a stored profile associated with the second user, as described in FIGS. 1-4.

The media guidance application may store, in the first user profile, a data structure such as a structure in C++, that contains variables referring to the specific media asset the first user is authorized to access and any conditions attached to the ability to access, as described above in FIG. 5. The media guidance application may set variables in the data structure based on the selections of conditions required by the second user for the first user to access the media asset. For example, upon the media guidance application receiving a conditional approval condition for media asset 608, the media guidance application may store the conditions in a data structure associated with media asset 608 in the first profile, as described above. For example, upon receiving a selection of selectable option 610 and receipt of a start and end time, the media guidance application may set variables "start" and "end" to the times selected by the user with authority to approve access. The media guidance application may then check to ensure that the condition is met before unblocking the media asset for access by the first user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PCTV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 7:
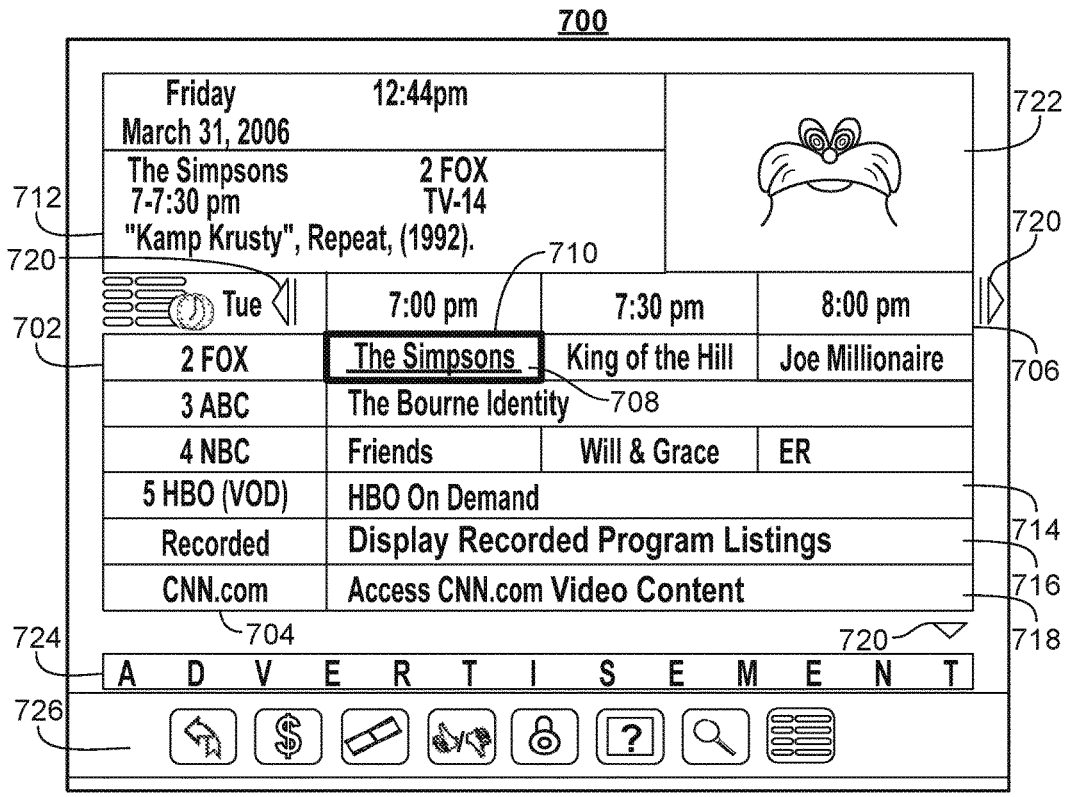
FIG. 7 shows an illustrative example of a display screen for use in accessing media content in accordance with some embodiments of the disclosure.
Figure 8:
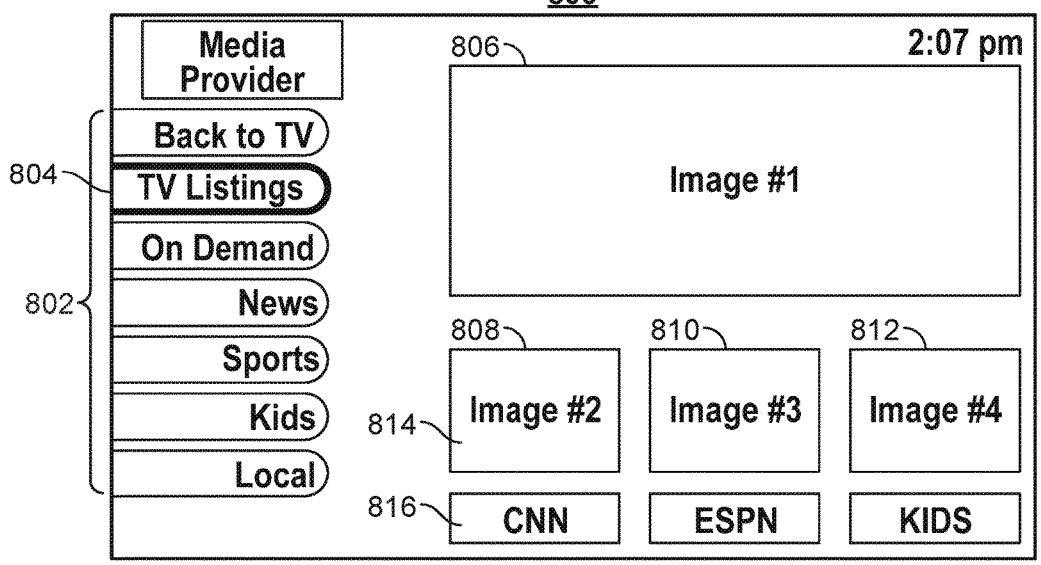
FIG. 8 shows another illustrative example of a display screen used access media content in accordance with some embodiments of the disclosure.

FIGS. 7-8 show illustrative display screens that may be used to provide media guidance data. The display screens shown in FIGS. 7-8 may be implemented on any suitable user equipment device or platform. While the displays of FIGS. 7-8 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 7 shows illustrative grid of a program listings display 700 arranged by time and channel that also enables access to different types of content in a single display. Display 700 may include grid 702 with: (1) a column of channel/content type identifiers 704, where each channel/content type identifier (which is a cell in the column) identifies a different channel or content type available; and (2) a row of time identifiers 706, where each time identifier (which is a cell in the row) identifies a time block of programming. Grid 702 also includes cells of program listings, such as program listing 708, where each listing provides the title of the program provided on the listing's associated channel and time. With a user input device, a user can select program listings by moving highlight region 710. Information relating to the program listing selected by highlight region 710 may be provided in program information region 712. Region 712 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office. Inc. Internet content may include web events, such as a chat session or Webcast, or content available on-demand as streaming content or downloadable content through an Internet web site or other Internet access (e.g. FTP).

Grid 702 may provide media guidance data for non-linear programming including on-demand listing 714, recorded content listing 716, and Internet content listing 718. A display combining media guidance data for content from different types of content sources is sometimes referred to as a "mixed-media" display. Various permutations of the types of media guidance data that may be displayed that are different than display 700 may be based on user selection or guidance application definition (e.g., a display of only recorded and broadcast listings, only on-demand and broadcast listings, etc.). As illustrated, listings 714, 716, and 718 are shown as spanning the entire time block displayed in grid 702 to indicate that selection of these listings may provide access to a display dedicated to on-demand listings, recorded listings, or Internet listings, respectively. In some embodiments, listings for these content types may be included directly in grid 702. Additional media guidance data may be displayed in response to the user selecting one of the navigational icons 720. (Pressing an arrow key on a user input device may affect the display in a similar manner as selecting navigational icons 720.)

Display 700 may also include video region 722, and options region 726. Video region 722 may allow the user to view and/or preview programs that are currently available, will be available, or were available to the user. The content of video region 722 may correspond to, or be independent from, one of the listings displayed in grid 702. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 726 may allow the user to access different types of content, media guidance application displays, and/or media guidance application features. Options region 726 may be part of display 700 (and other display screens described herein), or may be invoked by a user by selecting an on-screen option or pressing a dedicated or assignable button on a user input device. The selectable options within options region 726 may concern features related to program listings in grid 702 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 10. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 8. Video mosaic display 800 includes selectable options 802 for content information organized based on content type, genre, and/or other organization criteria In display 800, television listings option 804 is selected, thus providing listings 806, 808, 810, and 812 as broadcast program listings. In display 800 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 808 may include more than one portion, including media portion 814 and text portion 816. Media portion 814 and/or text portion 816 may be selectable to view content in full-screen or to view information related to the content displayed in media portion 814 (e.g., to view listings for the channel that the video is displayed on).

The listings in display 800 are of different sizes (i.e., listing 806 is larger than listings 808, 810, and 812), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 9 shows a generalized embodiment of illustrative user equipment device 900. More specific implementations of user equipment devices are discussed below in connection with FIG. 10. User equipment device 900 may receive content and data via input/output (hereinafter "I/O") path 902. I/O path 902 may provide content (e.g., broadcast programming, on-demand programming, Internet content, content available over a local area network (LAN) or wide area network (WAN), and/or other content) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for a media guidance application stored in memory (i.e., storage 908). Specifically, control circuitry 904 may be instructed by the media guidance application to perform the functions discussed above and below. For example, the media guidance application may provide instructions to control circuitry 904 to generate the media guidance displays. In some implementations, any action performed by control circuitry 904 may be based on instructions received from the media guidance application.

In client-server based embodiments, control circuitry 904 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 10, may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of the user equipment 900. Circuitry 904 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

A user may send instructions to control circuitry 904 using user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of user equipment device 900. For example, display 912 may be a touchscreen or touch-sensitive display. In such circumstances, user input interface 910 may be integrated with or combined with display 912. Display 912 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 912 may be HDTV-capable. In some embodiments, display 912 may be a 3D display, and the interactive media guidance application and any suitable content may be displayed in 3D. A video card or graphics card may generate the output to the display 912. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 904. The video card may be integrated with the control circuitry 904. Speakers 914 may be provided as integrated with other elements of user equipment device 900 or may be stand-alone units. The audio component of videos and other content displayed on display 912 may be played through speakers 914. In some embodiments, the audio may be distributed to a receiver (not shown), which processes and outputs the audio via speakers 914.

The guidance application may be implemented using any suitable architecture. For example, it may be a stand-alone application wholly-implemented on user equipment device 900. In such an approach, instructions of the application are stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to generate any of the displays discussed herein. Based on the processed instructions, control circuitry 904 may determine what action to perform when input is received from input interface 910. For example, movement of a cursor on a display up/down may be indicated by the processed instructions when input interface 910 indicates that an up/down button was selected.

In some embodiments, the media guidance application is a client-server based application. Data for use by a thick or thin client implemented on user equipment device 900 is retrieved on-demand by issuing requests to a server remote to the user equipment device 900. In one example of a client-server based guidance application, control circuitry 904 runs a web browser that interprets web pages provided by a remote server. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on equipment device 900. This way, the processing of the instructions is performed remotely by the server while the resulting displays are provided locally on equipment device 900. Equipment device 900 may receive inputs from the user via input interface 910 and transmit those inputs to the remote server for processing and generating the corresponding displays.

For example, equipment device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to equipment device 900 for presentation to the user.

In some embodiments, the media guidance application is downloaded and interpreted or otherwise run by an interpreter or virtual machine (run by control circuitry 904). In some embodiments, the guidance application may be encoded in the ETV Binary Interchange Format (EBIF), received by control circuitry 904 as part of a suitable feed, and interpreted by a user agent running on control circuitry 904. For example, the guidance application may be an EBIF application. In some embodiments, the guidance application may be defined by a series of JAVA-based files that are received and run by a local virtual machine or other suitable middleware executed by control circuitry 904. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 900 of FIG. 9 can be implemented in system 1000 of FIG. 10 as user television equipment 1002, user computer equipment 1004, wireless user communications device 1006, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. In some embodiments, the media guidance application may be executed simultaneously by multiple user devices. Various network configurations of devices may be implemented and are discussed in more detail below.

A user equipment device utilizing at least some of the system features described above in connection with FIG. 9 may not be classified solely as user television equipment 1002, user computer equipment 1004, or a wireless user communications device 1006. For example, user television equipment 1002 may, like some user computer equipment 1004, be Internet-enabled allowing for access to Internet content, while user computer equipment 1004 may, like some television equipment 1002, include a tuner allowing for access to television programming. The media guidance application may have the same layout on various different types of user equipment or may be tailored to the display capabilities of the user equipment. For example, on user computer equipment 1004, the guidance application may be provided as a web site accessed by a web browser. In another example, the guidance application may be scaled down for wireless user communications devices 1006.

In system 1000, there is typically more than one of each type of user equipment device but only one of each is shown in FIG. 10 to avoid overcomplicating the drawing. In addition, each user may utilize more than one type of user equipment device and also more than one of each type of user equipment device.

In some embodiments, a user equipment device (e.g., user television equipment 1002, user computer equipment 1004, wireless user communications device 1006) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1014. Namely, user television equipment 1002, user computer equipment 1004, and wireless user communications device 1006 are coupled to communications network 1014 via communications paths 1008, 1010, and 1012, respectively. Communications network 1014 may be one or more networks including the Internet, a mobile phone network, mobile voice or data network (e.g., a 4G or LTE network), cable network, public switched telephone network, or other types of communications network or combinations of communications networks. Paths 1008, 1010, and 1012 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1012 is drawn with dotted lines to indicate that in the exemplary embodiment shown in FIG. 10 it is a wireless path and paths 1008 and 1010 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 1008, 1010, and 1012, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1014.

System 1000 includes content source 1016 and media guidance data source 1018 coupled to communications network 1014 via communication paths 1020 and 1022, respectively. Paths 1020 and 1022 may include any of the communication paths described above in connection with paths 1008, 1010, and 1012. Communications with the content source 1016 and media guidance data source 1018 may be exchanged over one or more communications paths, but are shown as a single path in FIG. 10 to avoid overcomplicating the drawing. In addition, there may be more than one of each of content source 1016 and media guidance data source 1018, but only one of each is shown in FIG. 10 to avoid overcomplicating the drawing. (The different types of each of these sources are discussed below.) If desired, content source 1016 and media guidance data source 1018 may be integrated as one source device. Although communications between sources 1016 and 1018 with user equipment devices 1002, 1004, and 1006 are shown as through communications network 1014, in some embodiments, sources 1016 and 1018 may communicate directly with user equipment devices 1002, 1004, and 1006 via communication paths (not shown) such as those described above in connection with paths 1008, 1010, and 1012.

Content source 1016 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1016 may be the originator of content (e.g., a television broadcaster, a Webcast provider, etc.) or may not be the originator of content (e.g., an on-demand content provider, an Internet provider of content of broadcast programs for downloading, etc.). Content source 1016 may include cable sources, satellite providers, on-demand providers, Internet providers, over-the-top content providers, or other providers of content. Content source 1016 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1018 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1018 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1018 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1018 may provide user equipment devices 1002, 1004, and 1006 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 908, and executed by control circuitry 904 of a user equipment device 900. In some embodiments, media guidance applications may be client-server applications where only a client application resides on the user equipment device, and server application resides on a remote server. For example, media guidance applications may be implemented partially as a client application on control circuitry 904 of user equipment device 900 and partially on a remote server as a server application (e.g., media guidance data source 1018) running on control circuitry of the remote server. When executed by control circuitry of the remote server (such as media guidance data source 1018), the media guidance application may instruct the control circuitry to generate the guidance application displays and transmit the generated displays to the user equipment devices. The server application may instruct the control circuitry of the media guidance data source 1018 to transmit data for storage on the user equipment. The client application may instruct control circuitry of the receiving user equipment to generate the guidance application displays.

Content and/or media guidance data delivered to user equipment devices 1002, 1004, and 1006 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1000 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 10.

In one approach, user equipment devices may communicate with each other within a home network. User equipment devices can communicate with each other directly via short-range point-to-point communication schemes described above, via indirect paths through a hub or other similar device provided on a home network, or via communications network 1014. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1016 to access content. Specifically, within a home, users of user television equipment 1002 and user computer equipment 1004 may access the media guidance application to navigate among and locate desirable content. Users may also access the media guidance application outside of the home using wireless user communications devices 1006 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1014. These cloud resources may include one or more content sources 1016 and one or more media guidance data sources 1018. In addition or in the alternative, the remote computing sites may include other user equipment devices, such as user television equipment 1002, user computer equipment 1004, and wireless user communications device 1006. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1004 or wireless user communications device 1006 having content capture feature. Alternatively, the user can first transfer the content to a user equipment device, such as user computer equipment 1004. The user equipment device storing the content uploads the content to the cloud using a data transmission service on communications network 1014. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 9.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 11:
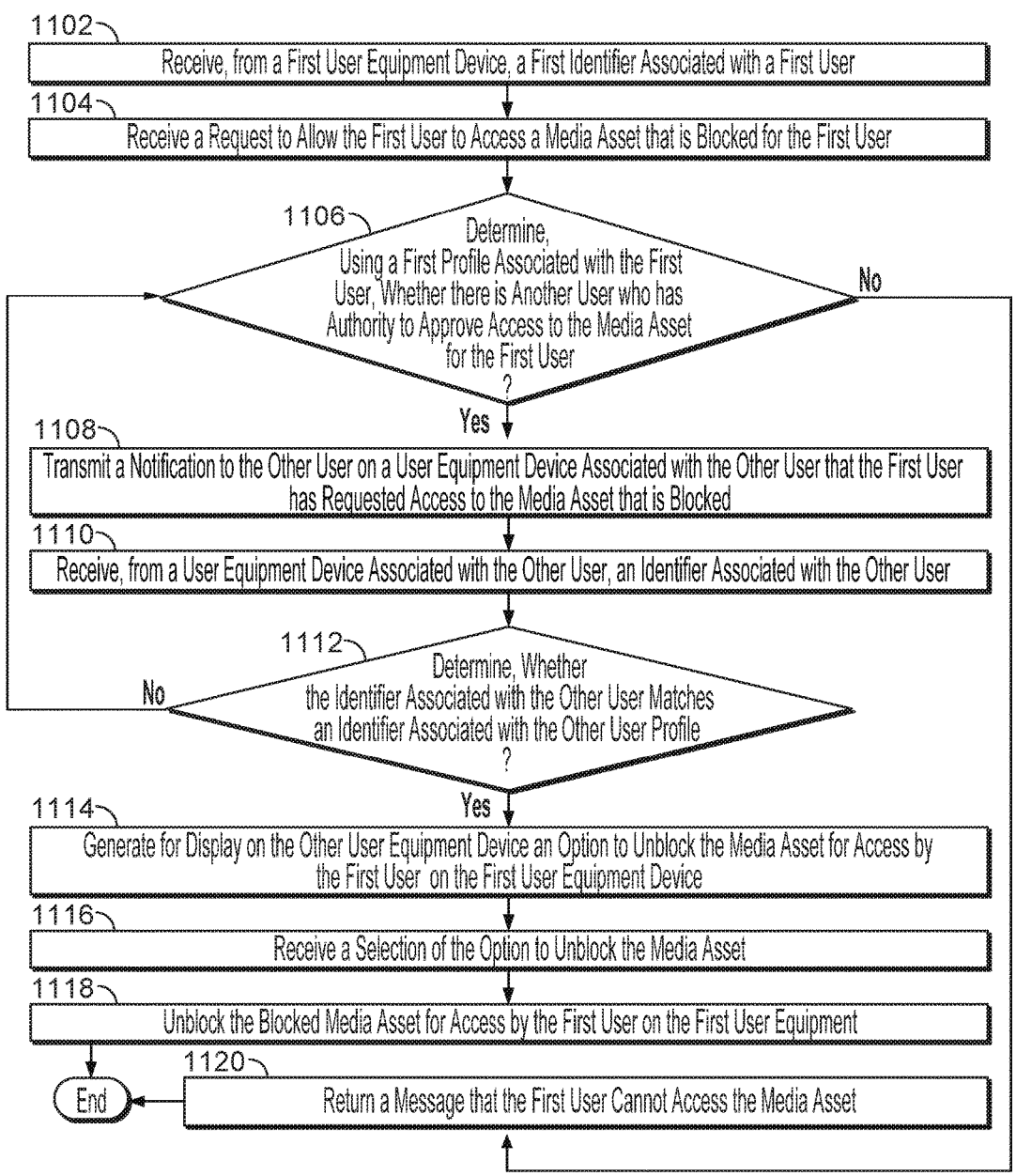
FIG. 11 is a flowchart of illustrative steps for allowing a user to access a blocked media asset in accordance with some embodiments of the disclosure.

FIG. 11 is a flowchart of illustrative steps for allowing a user to access a blocked media asset in accordance with some embodiments of the disclosure. Process 1100 may be used to determine if another user has allowed the first user access to the blocked media in response to their request to access the blocked media. The term "another user" will be used herein to refer to any user with the authority to approve access of the blocked media by the first user. For example, two parents and a grandparent may be designated as having the authority to approve access for a child's account; all three would fall under the umbrella of "another user," or once mentioned, "the other user," as described in this application. It should be noted that process 1100 or any step thereof, could occur on, or be provided by, any of the devices shown in FIGS. 9-10. For example, process 1100 may be executed by control circuitry 904 as instructed by the media guidance application (e.g., implemented on any of the devices shown and described in FIG. 10).

Process 1100 begins at 1102, where the media guidance application receives, from a first user equipment device (e.g., any of the user equipment shown and described in FIG. 10), a first identifier associated with a first user. In some embodiments, the media guidance application stores the identifier in storage 908. For example, when the media guidance application is executed on a particular user equipment device (e.g., any of the user equipment shown and described in FIG. 10), the media guidance application automatically receives the identifier, since it is stored in storage 908. In other embodiments, the media guidance application receives the user input of the identifier, using user input interface 910. The identifier may comprise any finite string of characters, such as numbers and letters. For example, a received identifier could be, "1234" or "John123." The media guidance application may then determine if this identifier matches an identifier stored in an index data structure of user profiles, and if so, access the profile.

Process 1100 may continue to 1104, where the media guidance application receives a request to allow the first user to access a media asset that is blocked for the first user. As described in FIGS. 1-2 above, the media guidance application stores each individual profile, such as the profile for "John123," in a data structure, which could be stored in storage 908 or remotely at media guidance data source 1018. For example, the media guidance application may store an object of the user profile class where the variables and constants are initialized with values appropriate to the specific user (e.g., John). The media guidance application may receive from the first user, via user input interface 910, a request to access a media asset.

The media guidance application then compares metadata associated with the media asset, such as the rating of the media asset, with data stored in the data structure corresponding to the first user profile to determine if the media asset is blocked for the user. For example, the media guidance application may receive a user request to access a program with a rating of "TV-MA." The media guidance application may compare this rating with a threshold rating stored in the data structure corresponding to the first user profile, "TV-14." Since the rating of the requested program is higher than the rating stored in the first user profile, the media guidance application may block the program and prevent the first user from accessing it.

In some embodiments, the media guidance application then generates for display (e.g., on display 100 or 300) an option to transmit (e.g., 306) a notification containing a request to access the media via communications network 1014 to another user. Upon selection of the option to transmit (e.g., 306), process 1100 may proceed to 1106. In other embodiments, the media guidance application may automatically transmit a notification to another user to request access to the media asset without any further user input.

Process 1100 may continue to 1106, where the media guidance application determines, using a first profile associated with the first user, if there is another user who has authority to approve access to the media asset for the first user. The media guidance application queries the data structure associated with the first profile, which could be stored in storage 908 or remotely at media guidance data source 1018, to determine if a user has been designated as having the authority to approve access. For example, the media guidance application could declare a custom structure in an object oriented programming language such as C++, where the structure contains a string with the identifier of another user and a boolean that indicates whether the user has the authority to approve access to the media asset for the first user. The media guidance application may execute a script which declares the structure "approver" with the two types described above, and then creates an instance for each user that has the authority to approve and store them in the first profile (e.g., "approver MOM" and "approver DAD" where each has a Boolean approver="True"). Alternatively, the media guidance application could store which users have authority to approve access in such data structures as lists or vectors.

The media guidance application then determines whether there is a user with authority to approve access based on whether the query returns that a data structure containing users with the authority to approve access to the media asset exists, is empty, or contains one or more identifiers of users. If the data structure does not exist or is empty, the media guidance application may determine that there is not another user who has authority to approve access. If the data structure contains one or more identifiers, the media guidance application may determine that there is another user who has authority to approve access.

If process 1106 determines there is no other user who has authority to approve access, process 1100 may continue to 1120, where the media guidance application returns a message that the first user cannot access the media asset. For example, the media guidance application may generate for display (e.g. on display 100 or 300) that the notification could not be delivered since no users with authority to approve access are associated with the first user's account.

Figure 13:
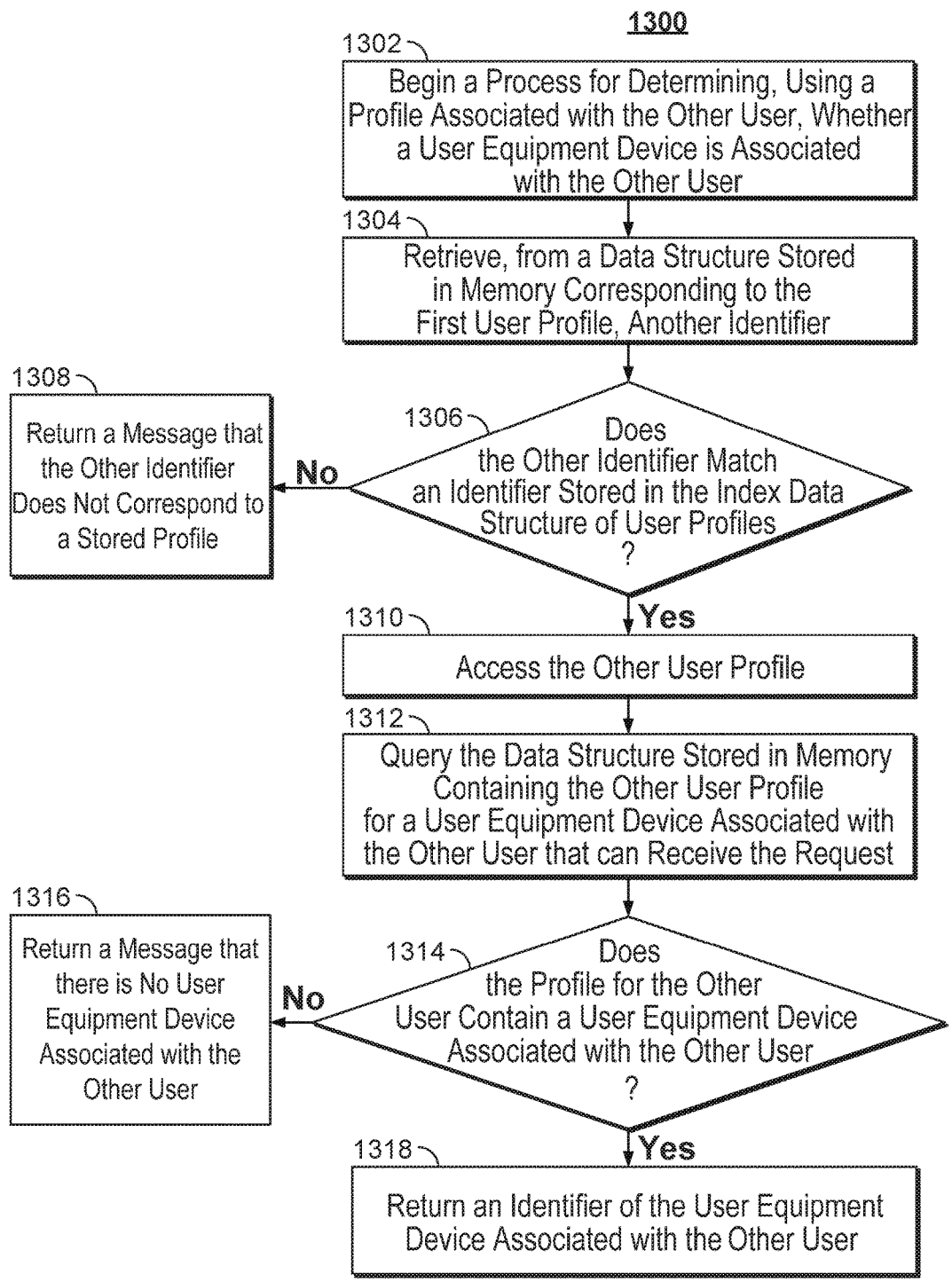
FIG. 13 is a flowchart of illustrative steps for determining, from a second profile associated with the second user, whether a second user equipment device is associated with the second user in accordance with some embodiments of the disclosure.

In some embodiments, if at 1106 the media guidance application determines there is another user who has authority to approve access, process 1100 may perform one or more additional steps between 1106 and 1108 as outlined in FIG. 13, where the media guidance application determines, using a profile associated with the other user, whether a user equipment device (e.g. any of the user equipment shown and described in FIG. 10) is associated with the other user. The media guidance application may retrieve from the first profile an identifier associated with another user who has authority to approve access of the media asset. The media guidance application may then determine if this identifier matches an identifier stored in an index data structure of user profiles, which could be stored in storage 908 or remotely at media guidance data source 1018, and if so, access the profile. The media guidance application then queries a data structure containing the profile for a user equipment device (e.g., any of the user equipment shown and described in FIG. 10) associated with the user with authority to approve access to the media asset where they may be able to receive the notification from the first user. As was described in 1106, if the data structure does not exist or is empty, the media guidance application determines that there is not a user equipment device associated with the other user. If the data structure contains one or more identifiers, the media guidance application determines that there is a user equipment device associated with the other user.

If process 1106 determines there is a user who has authority to approve access, process 1100 may continue to 1108, where the media guidance application transmits a notification (e.g., 206 or 412) to the other user on the display (e.g., 200 or 400) of a user equipment device associated with the other user that the first user has requested access to the media asset that is blocked. The media guidance application may retrieve contact information for the user equipment device associated with the other user from the data structure corresponding to the other user profile and transmit a notification (e.g., 206 or 412) that the first user has requested to access the blocked media asset. For example, the media guidance application may retrieve a phone number for wireless user communications device 1006 (e.g., a mobile phone) associated with the other user. The media guidance application may then transmit the notification via text message to wireless communications device 1006.

Process 1100 may continue to 1110, where the media guidance application receives, from a user equipment device (e.g., any of the user equipment shown and described in FIG. 10) associated with the other user, an identifier associated with the other user. In some embodiments, the media guidance application may store the identifier in storage 908. For example, when the media guidance application is executed on a particular user equipment device, the media guidance application automatically receives the identifier, since it is stored in storage 908. In other embodiments, the media guidance application may receive the user input of the identifier, using user input interface 910. The identifier may comprise any finite string of characters, such as numbers and letters. For example, an inputted identifier could be, "1234" or "Mom1980."

Process 1100 may continue to 1112, where the media guidance application determines the identifier associated with the other user matches an identifier associated with the user profile of the other user. As described in FIGS. 1-2 above, the media guidance application may store each individual profile, such as the profile for "Mom1980," in a data structure, which could be stored in storage 908 or remotely at media guidance data source 1018. For example, the media guidance application may store an instantiated object of the user profile class where the variables and constants are initialized with values appropriate to the specific user (e.g., Mom). The media guidance application may then compare this identifier to identifiers stored in an index data structure of user profiles, and determine if there is a match. If there is a match, then the identifier corresponds to a stored profile associated with the other user. If there is not a match, then the identifier does not correspond to a stored profile.

If the identifier does not correspond to a stored profile, process 1100 may move back to 1106, where the media guidance application may determine, using a first profile associated with the first user, yet another user who has authority to approve access to the media asset for the first user. For example, if the media guidance application determines that the user to whom the notification was sent cannot correctly enter his or her identifier, the media guidance application may attempt to determine yet another user to transmit the notification to. In some embodiments, the media guidance application may receive multiple inputs from the other user using user input interface 910 of an identifier until a threshold number of inputs are reached, at which time the media guidance application may attempt to determine if there is yet another user with the authority to approve access. For example, the media guidance application may receive an identifier that does not match any identifiers stored in memory from one parent of a child five times, at which point the media guidance application may transmit the notification to the other parent if they also have the authority to approve access to media assets for the child.

If the identifier corresponds to a stored profile, process 1100 may continue to 1114, where the media guidance application generates for display an option to unblock the media asset for access by the first user on the first user equipment device. The media guidance application may generate for display (e.g., on display 200 or 400)) an option to unblock (e.g., 208 or 414) the media asset for access by the first user on the first user equipment device (e.g., any of the user equipment shown and described in FIG. 10) in response to determining the identifier of the other user matches an identifier associated with the profile of the other user. For example, upon the media guidance application determining that the user of the device is Mom, based on the received identifier "Mom1980" pointing to the profile associated with Mom, the media guidance application generates for display (e.g., on display 200 or 400) a selectable icon (e.g., 208 or 414) or other selectable feature to the user Mom indicating that she can unblock the media asset in the notification (e.g., 206 or 412) that the first user wishes to access.

Process 1100 may continue to 1116, where the media guidance application may receive a selection of the option to unblock the media asset. The media guidance application may store, in the first user profile, a data structure such as a structure in C++, that contains variables referring to the specific media asset the first user is authorized to access and any conditions attached to the ability to access that media asset, as outlined in FIGS. 5-6. For example, after the other user has approved access by the first user of the media asset, the media guidance application may unblock the media asset and allow the first user to access the media asset. Additionally, if the other user has stipulated any conditions attached to accessing the media asset, the media guidance application will implement those as well and store them in the data structure described above. For example, if the media guidance application receives an indication from the other user that the first user should not view a television program after 8 pm, the media guidance application will store and initialize a variable "end time" to be "8 pm" and unblock the program only until 8 pm.

Process 1100 may continue to 1118, where the media guidance application unblocks the blocked media asset for access by the first user on the first user equipment. For example, the media guidance application may store, in the first user profile, a data structure such as a structure in C++, that contains variables referring to the specific media asset the first user is authorized to access and any conditions attached to the ability to access, as described above in FIG. 5-6, and allow the first user using the first user equipment (e.g., any of the user equipment shown and described in FIG. 10) to access the media asset pursuant to the conditions stored in the data structure.

Figure 12:
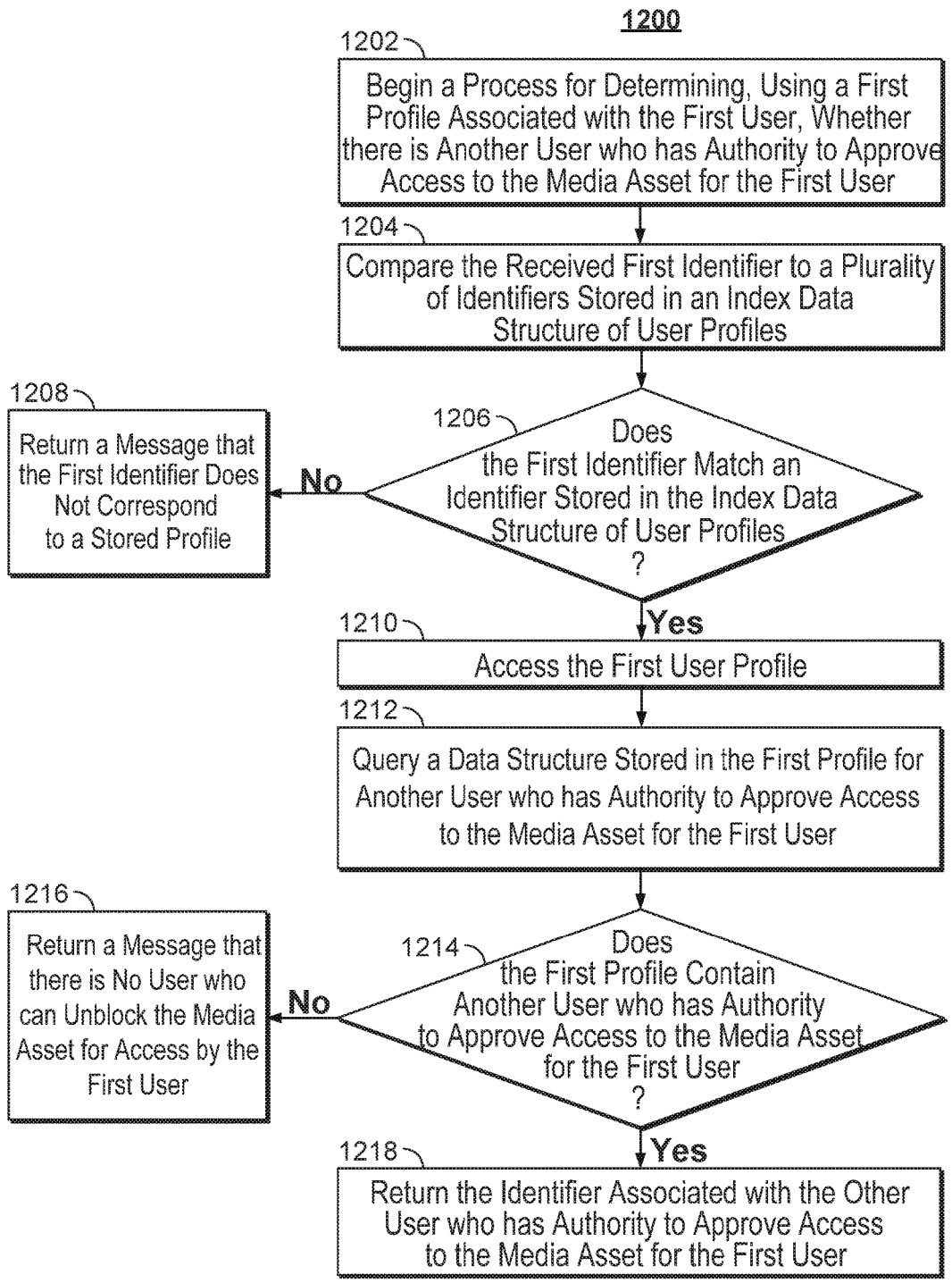
FIG. 12 is a flowchart of a set of illustrative steps for determining, in a first profile associated with the first user, a second user who has authority to approve access to the media asset for the first user in accordance with some embodiments of the disclosure.

FIG. 12 is a flowchart of a set of illustrative steps for determining, in a first profile associated with the first user, a second user who has authority to approve access to the media asset for the first user in accordance with some embodiments of the disclosure. Process 1200 may be used to determine another user who can approve access to the media asset requested by the first user. It should be noted that process 1200 or any step thereof, could occur on, or be provided by, any of the devices shown in FIGS. 9-10. For example, process 1200 may be executed by control circuitry 904 (FIG. 9) as instructed by the media guidance application (e.g., implemented on any of the devices shown and described in FIG. 10).

Process 1200 begins with 1202, where the media guidance application begins a process for determining, using a first profile associated with the first user, another user who has authority to approve access to the media asset for the first user. For example, the media guidance application may determine, by accessing the first profile stored in either storage 908 or remotely at media guidance data source 1018 via communications network 1014, another user who has authority to approve access to the media asset for the first user.

Process 1200 may continue to 1204, where the media guidance application compares the received first identifier to a plurality of identifiers stored in an index data structure of user profiles. The media guidance application may compare the received identifier with a plurality of identifiers stored in an index data structure at either storage 908 or remotely at media guidance data source 1018 accessible via communications network 1014. The media guidance application may associate a pointer to a user profile with each identifier in the index data structure.

Process 1200 may continue to 1206, where the media guidance application determines if the first identifier matches an identifier stored in the index data structure of user profiles. The media guidance application may compare the contents of the received identifier and the identifiers stored in the index data structure. For example, the received identifier may be stored as a string and compared to identifiers stored in the index data structure as strings. If the media guidance application determines that every character in the received identifier matches every character in a stored identifier, the media guidance application may return a Boolean that the two identifiers match to "True."

If the first identifier does not match an identifier stored in the index data structure of user profiles, process 1200 may continue to 1208, where the media guidance application returns a message that the first identifier does not correspond to a stored profile. In this case, the media guidance application would not be able to determine a user with authority to approve access for the first user since the first user does not have a profile; as such, the media asset would remain blocked for the first user.

If the first identifier matches an identifier stored in the index data structure of user profiles, process 1200 may continue to 1210, where the media guidance application accesses the first user profile. The media guidance application may access the first user profile based on data stored with the matched identifier in the index data structure. For example, the media guidance application may determine a data structure associated with the first user profile based on a pointer to the data structure associated with the identifier in the index data structure. The media guidance application may then access the data structure corresponding to the first user profile.

Process 1200 may continue to 1212, where the media guidance application queries a data structure stored in memory containing the first profile for another user who has authority to approve access to the media asset for the first user. For example, the media guidance application could declare a structure in an object oriented programming language such as C++, as described above in FIG. 11, containing an identifier and an indication whether the user has the authority to approve access to media assets. The media guidance application may then determine whether there is a user with authority to approve access based on whether the query returns that a data structure containing users with the authority to approve access to the media asset exists, is empty, or contains one or more identifiers of users.

Process 1200 may continue to 1214, where the media guidance application determines whether the first profile contains another user who has authority to approve access to the media asset for the first user. The media guidance application may determine if the first profile contains another user based on the querying in 1212. If the data structure does not exist or is empty, the media guidance application determines that there is not another user who has authority to approve access. If the data structure contains one or more identifiers, the media guidance application determines that there is another user who has authority to approve access.

If the first profile does not contain another user who has authority to approve access to the media asset, process 1200 may continue to 1216, where the media guidance application may return a message that there is no user who can unblock the media asset for access by the first user. In this case, the media guidance application cannot find any users to transmit the notification to allow access to the media asset; as such, the media asset would remain blocked for the first user.

If the first profile does contain another user who has authority to approve access to the media asset, process 1200 may continue to 1218, where the media guidance application returns the identifier associated with the other user who has authority to approve access to the media asset for the first user. For example, the media guidance application may return "Mom1980" (e.g., the identifier of user Mom 112), based on querying a profile associated with user John (e.g., user 106).

FIG. 13 is a flowchart of a set of illustrative steps for determining, from a second profile associated with the second user, whether a second user equipment device is associated with the second user in accordance with some embodiments of the disclosure. Process 1300 may be used to determine if there is a user equipment device (e.g., any of the user equipment shown and described in FIG. 10) that can receive the notification from the first user to unblock the media asset. It should be noted that process 1300 or any step thereof, could occur on, or be provided by, any of the devices shown in FIGS. 9-10. For example, process 1300 may be executed by control circuitry 904 (FIG. 9) as instructed by the media guidance application (e.g., implemented on any of the devices shown and described in FIG. 10).

Process 1300 begins with 1302, where the media guidance application begins a process for determining, using a profile associated with the other user, whether a user equipment device is associated with the other user. For example, the media guidance application determines in a profile associated with the other user that user equipment (e.g., any of the user equipment shown and described in FIG. 10) associated with the other user can be used to display (e.g., on display 200 or 400) the notification 206 from the first user.

Process 1300 may continue to 1304, where the media guidance application retrieves, from a data structure stored in memory corresponding to the first user profile, the other identifier. For example, the media guidance application may retrieve the identifier from the data structure corresponding to the first profile stored in storage 908 or remotely at media guidance data source 1018 via communications network 1014. The media guidance application may retrieve the string, "Mom1980" corresponding to the other user.

Process 1300 may continue to 1306, where the media guidance application may determine if the other identifier matches an identifier stored in the index data structure of user profiles. The media guidance application may determine whether the retrieved the other identifier matches a stored identifier in the index data structure of user profiles in the same way as described above in FIG. 12. Briefly, the media guidance application may compare the retrieved the other identifier with a plurality of identifiers stored in the index data structure and determine if there is a match.

If the other identifier does not match an identifier stored in the index data structure, process 1300 may continue to 1308, where the media guidance application returns a message that the other identifier does not correspond to a stored profile. In this case, the media guidance application would not be able to determine a user equipment device (e.g., any of the user equipment shown and described in FIG. 10) to transmit the notification to allow access to the media asset, since there is no profile associated with the identifier, causing process 1300 to return "No." The media guidance application may then attempt to determine if there are any other users with authority to approve access (e.g., process 1100 would return to 1106).

If the other identifier does match an identifier stored in the index data structure, process 1300 may continue to 1310, where the media guidance application accesses the other user profile. The media guidance application accesses the other user profile based on data stored with the matched identifier in the index data structure. For example, the media guidance application determines a data structure associated with the other user profile based on a pointer to the data structure associated with the identifier in the index data structure. The media guidance application then accesses the data structure corresponding to the other user profile.

Process 1300 may continue to 1312, where the media guidance application queries the data structure stored in memory containing the other user profile for a user equipment device associated with the other user that can receive the notification. For example, the media guidance application could declare a structure in an object oriented programming language such as C++, similar to that described above in FIG. 11, containing an identifier of the device and contact information. For example, the contact information could be a mobile phone number or an email address. The media guidance application may then determine whether there is a device on which the other user can receive the notification to allow access to the blocked media based on whether the query returns that a data structure of user equipment devices (e.g. any of the user equipment shown and described in FIG. 10) associated with the other user exists, is empty, or contains one or more identifiers of users.

Process 1300 may continue to 1314, where the media guidance application determines if the profile for the other user contains a user equipment device associated with the other user. The media guidance application determines if the other profile contains a user equipment device (e.g. any of the user equipment shown and described in FIG. 10) associated with the other user based on the querying in 1314. If the data structure does not exist or is empty, the media guidance application determines that there is not a user equipment device associated with the other user. If the data structure contains one or more identifiers, the media guidance application determines that there is a user equipment device associated with the other user.

If the profile for the other user does not contain a user equipment device associated with the other user, process 1300 may continue to 1316, where the media guidance application returns a message that there is no user equipment device (e.g., any of the user equipment shown and described in FIG. 10) associated with the other user. In this case, the media guidance application would not be able to transmit the notification since there is no user equipment stored that can receive it, causing process 1300 to return "No." The media guidance application may then attempt to determine if there are any other users with authority to approve access (e.g., process 1100 would return to 1106).

If the profile for the other user does contain a user equipment device associated with the other user, process 1300 may continue to 1318, where the media guidance application returns an identifier of the user equipment device associated with the other user. For example, the media guidance application may return the identifier "Mom's phone," corresponding to a user equipment device (e.g., any of the user equipment shown and described in FIG. 10) based on querying a profile associated with the other user (e.g., Mom).

Figure 14:
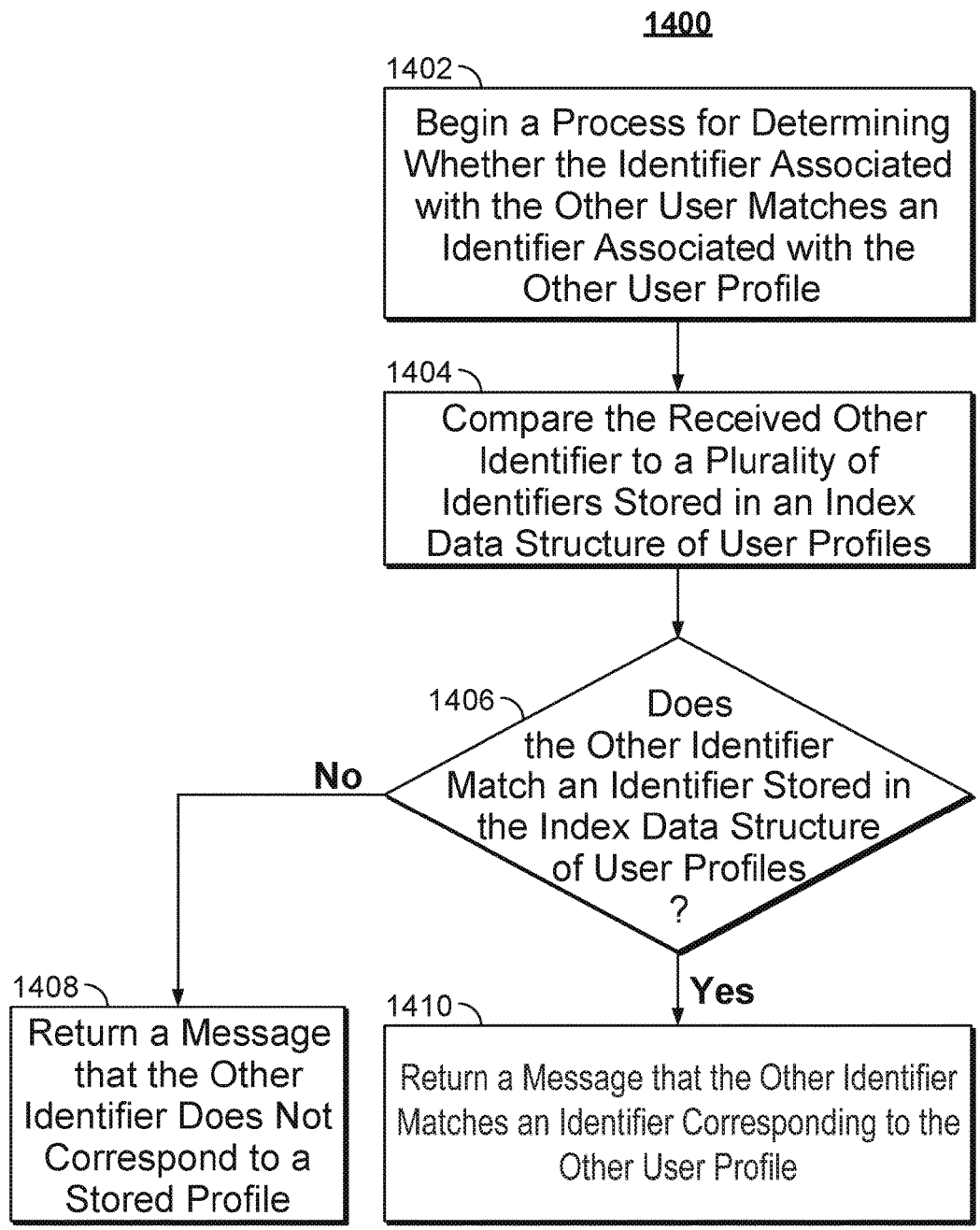
FIG. 14 is a flowchart of illustrative steps for determining the second identifier matches an identifier associated with the second profile in accordance with some embodiments of the disclosure.

FIG. 14 is a flowchart of illustrative steps for determining the second identifier matches an identifier associated with the second profile in accordance with some embodiments of the disclosure. Process 1400 may be used to determine if the received second identifier corresponds to an identifier of a profile stored in memory. It should be noted that process 1400 or any step thereof, could occur on, or be provided by, any of the devices shown in FIGS. 9-10. For example, process 1400 may be executed by control circuitry 904 (FIG. 9) as instructed by the media guidance application (e.g., implemented on any of the devices shown and described in FIG. 10).

Process 1400 begins with 1402, where the media guidance application begins a process for determining whether the other identifier matches an identifier associated with the other user profile. For example, the media guidance application determines, by comparing the received identifier with identifiers stored in an index data structure in either storage 908 or remotely at media guidance data source 1018 via communications network 1014, if a user profile corresponding to the other user exists.

Process 1400 may continue to 1404, where the media guidance application may compare the received other identifier to a plurality of identifiers stored in an index data structure of user profiles. Similar to the process described with respect to FIG. 12 above for determining a first user profile corresponding to a first identifier, the media guidance application may compare the received identifier with a plurality of identifiers stored in an index data structure at either storage 908 or remotely at media guidance data source 1018 accessible via communications network 1014. The media guidance application may associate a pointer to a user profile with each identifier in the index data structure.

Process 1400 may continue to 1406, where the media guidance application determines if the other identifier matches an identifier stored in the index data structure of user profiles. Similar to Process 1200 described above for determining a first user profile corresponding to a first identifier, the media guidance application may compare the contents of the received other identifier and the identifiers stored in the index data structure. For example, the received other identifier may be stored as a string and compared to identifiers stored in the index data structure as strings. If the media guidance application determines that every character in the received other identifier matches every character in a stored identifier, the media guidance application may return a Boolean output that the two identifiers match to "True."

If the other identifier does not match an identifier stored in the index data structure of user profiles, process 1400 may continue to 1408, where the media guidance application returns that the other identifier does not correspond to a stored profile. In this case, the media guidance application would not be able to authenticate that the user who has authority to provide access is currently using the user equipment device (e.g., any of the user equipment shown and described in FIG. 10) that the notification has been transmitted to. The media guidance application may then attempt to determine if there are any other users with authority to approve access (e.g., process 1100 would return to 1106 from 1114).

If the other identifier matches an identifier stored in the index data structure of user profiles, process 1400 may continue to 1410, where the media guidance application may return that the other identifier matches an identifier corresponding to the other user profile. For example, the media guidance application may determine a data structure associated with other user profile based on a pointer to the data structure associated with the identifier in the index data structure. The media guidance application may then access the data structure corresponding to the first user profile.

It is contemplated that the steps or descriptions of each of FIGS. 11-14 may be used with any other embodiment of this disclosure. In addition, the steps and descriptions described in relation to FIGS. 11-14 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-10 could be used to perform one or more of the steps in FIGS. 11-14.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for allowing a user to access a blocked media asset, the method comprising:
receiving, from a first user equipment device, a first identifier associated with a first user;
receiving a request to allow the first user to access a media asset that is blocked for the first user;
determining, in a first profile associated with the first user, a second user who has authority to approve access to the media asset for the first user;
in response to determining the second user who has authority to approve access to the media asset for the first user:
transmitting a notification to the second user on a second user equipment device associated with the second user that the first user has requested access to the media asset that is blocked;
receiving, from one of the second user equipment device and another user equipment device associated with the second user, a second identifier associated with the second user;
determining the second identifier matches an identifier associated with a second profile;
in response to determining the second identifier matches the identifier associated with the second profile:
generating for display an option to unblock the media asset for access by the first user on the first user equipment device; and
upon receiving a selection of the option to unblock the blocked media asset, unblocking the blocked media asset for access by the first user on the first user equipment.

2. The method of claim 1, wherein the first profile associated with the first user includes a data structure storing at least one of:
an age of the first user;
a flag indicating whether the first user has authority to approve access to the media asset;
a social media account associated with the first user;
a phone number associated with the first user;
an email address associated with the first user;
a list of viewing preferences of the first user; and
a list of user profiles that have approver rights for said first user profile.

3. The method of claim 1, further comprising:
comparing the first identifier to a plurality of identifiers associated with an account stored in an index data structure of user profiles; and
determining the first identifier matches an identifier associated with the first profile associated with the first user.

4. The method of claim 1, further comprising:
determining, from the second profile associated with the second user, whether a user equipment device is associated with the second user;
in response to determining no user equipment device is associated with the second user:
determining, from the first profile associated with the first user, a third user who has authority to approve access to the media asset for the first user.

5. The method of claim 1, wherein transmitting the notification to the second user on the second user equipment device that the first user has requested to access the media asset that is blocked includes at least one of:
a genre of the media asset;
a rating of the media asset;
a link to a webpage associated with the media asset;
a preview associated with the media asset;
a personalized communication from the first user; and
an indication why the media asset was blocked.

6. The method of claim 5, wherein the first user can personalize the notification to include at least one of:
a written message;
a photo;
a video; and
an audio message.

7. The method of claim 1, further comprising:
determining the second user is not available to respond to the notification;
determining, from the first profile associated with the first user, a third user who has authority to approve access to the media asset for the first user;
determining, from a third profile associated with the third user, whether a third user equipment device is associated with the third user;
in response to determining a third user equipment device is associated with the third user:
transmitting a notification to the third user on the third user equipment device that the first user has requested access to the media asset that is blocked;
receiving, from the third user equipment device, a third identifier associated with the third user;
determining the third identifier matches an identifier associated with the third profile;
in response to determining the third identifier matches the identifier associated with the third profile, generating for display the option to unblock the media asset for access by the first user on the first user equipment device; and upon receiving a selection of the option to unblock the media asset, unblocking the blocked media asset for access by the first user on the first user equipment.

8. The method of claim 7, wherein determining the second user is not available to respond to the notification further comprises at least one of:
   determining the second user has exceeded a threshold time to respond to the notification; and
   determining the second user equipment device is unable to receive the notification.

9. The method of claim 1, wherein the option to unblock the blocked media asset for access by the first user on the first user equipment device further includes at least one of:
   an option to communicate with the first user;
   an option to approve the media asset for access during a predetermined period of time; and
   an option to unblock a different version of the media asset.

10. The method of claim 1, further comprising:
    receiving, from the second user, a conditional allowance criterion to unblock the media asset if the allowance criterion is met by the first user;
    storing, in the first user profile, the allowance criterion to unblock the media asset;
    upon receiving the selection of the media asset by the first user, determining the media asset requires the allowance criterion to be met before unblocking the media asset;
    generating for display the notification, wherein the notification identifies the allowance criterion;
    receiving input from the first user that the allowance criterion has been fulfilled; and
    in response to the receiving input that the allowance criterion has been fulfilled, unblocking the media asset for access by the first user.

11. A system for allowing a user to access a blocked media asset, the system comprising:
    storage circuitry;
    display circuitry; and
    control circuitry configured to:
      receive, from a first user equipment device, a first identifier associated with a first user;
      receive a request to allow the first user to access a media asset that is blocked for the first user;
      determine, in a first profile associated with the first user stored in storage circuitry, a second user who has authority to approve access to the media asset for the first user;
      in response to determining the second user who has authority to approve access to the media asset for the first user:
        transmit, via a communications network, a notification to the second user on a second user equipment device associated with the second user that the first user has requested access to the media asset that is blocked;
        receive, from one of the second user equipment device and another user equipment device associated with the second user, a second identifier associated with the second user;
        determine the second identifier matches an identifier associated with a second profile;
        in response to determining the second identifier matches an identifier associated with the second profile:
          generate for display, using display circuitry, an option to unblock the media asset for access by the first user on the first user equipment device; and
          upon receiving a selection of the option to unblock the media asset, unblock the blocked media asset for access by the first user on the first user equipment.

12. The system of claim 11, wherein storage circuitry storing the first profile associated with the first user includes a data structure additionally stores at least one of:
    an age of the first user;
    a flag indicating whether the first user has authority to approve access to the media asset;
    a social media account associated with the first user;
    a phone number associated with the first user;
    an email address associated with the first user;
    a list of viewing preferences of the first user; and
    a list of user profiles that have approver rights for said first user profile.

13. The system of claim 11, further comprising control circuitry configured to:
    compare the first identifier to a plurality of identifiers associated with an account stored in an index data structure of user profiles stored in storage circuitry; and
    determine the first identifier matches an identifier associated with the first profile associated with the first user.

14. The system of claim 11, further comprising control circuitry configured to:
    determine, from the second profile associated with the second user, whether a user equipment device is associated with the second user;
    in response to determining no user equipment device is associated with the second user:
      determine, from the first profile associated with the first user stored in storage circuitry, a third user who has authority to approve access to the media asset for the first user.

15. The system of claim 11, wherein the notification to the second user generated for display by display circuitry on the second user equipment device that the first user has requested to access the media asset that is blocked includes at least one of:
    a genre of the media asset;
    a rating of the media asset;
    a link to a webpage associated with the media asset;
    a preview associated with the media asset;
    a personalized communication from the first user; and
    an indication why the media asset was blocked.

16. The system of claim 15, wherein the first user can personalize the notification to include at least one of:
    a written message;
    a photo;
    a video; and
    an audio message.

17. The system of claim 11, further comprising control circuitry configured to:
    determine the second user is not available to respond to the notification;
    determine, from the first profile associated with the first user stored in storage circuitry, a third user who has authority to approve access to the media asset for the first user;
    determine, from a third profile associated with the third user stored in storage circuitry, whether a third user equipment device is associated with the third user;

in response to determining a third user equipment device is associated with the third user:
    transmit, via a communications network, a notification to the third user on the third user equipment device that the first user has requested access to the media asset that is blocked;
    receive, from the third user equipment device, a third identifier associated with the third user;
    determine the third identifier matches an identifier associated with the third profile;
    in response to determining the third identifier matches the identifier associated with the third profile, generate for display using display circuitry the option to unblock the media asset for access by the first user on the first user equipment device; and
    upon receiving a selection of the option to unblock the media asset, unblock the blocked media asset for access by the first user on the first user equipment.

18. The system of claim 17, wherein determining the second user is not available to respond to the notification further comprises at least one of control circuitry configured to:
    determine the second user has exceeded a threshold time to respond to the notification; and
    determine the second user equipment device is unable to receive the notification.

19. The system of claim 11, wherein the option to unblock the blocked media for access by the first user on the first user equipment device further includes display circuitry configured to generate for display at least one of:
    an option to communicate with the first user;
    an option to approve the media asset for access during a predetermined period of time; and
    an option to unblock a different version of the media asset.

20. The system of claim 11, further comprising control circuitry configured to:
    receive, from the second user, a conditional allowance criterion to unblock the media asset if the allowance criterion is met by the first user;
    store, in the first user profile stored in storage circuitry, the allowance criterion to unblock the media asset;
    upon receiving the selection of the media asset by the first user, determine the media asset requires the allowance criterion to be met before unblocking the media asset;
    generate for display, using display circuitry, the notification, wherein the notification identifies the allowance criterion;
    receive input from the first user that the allowance criterion has been fulfilled; and
    in response to the receiving input that the allowance criterion has been fulfilled, unblock the media asset for access by the first user.

\* \* \* \* \*